INVENTORS
R. J. WISE
G. H. RIDINGS
BY
A. H. Thomas
ATTORNEY

Feb. 5, 1952 | R. J. WISE ET AL | 2,584,775

FACSIMILE TRANSMITTER AND RECORDER WITH AUTOMATIC SHEET MOUNTING

Filed Dec. 10, 1946 | 10 Sheets-Sheet 2

INVENTORS
R. J. WISE
G. H. RIDINGS

BY

A. A. Thomas

ATTORNEY

INVENTORS
R. J. WISE
G. H. RIDINGS
BY
A. L. Thomas
ATTORNEY

INVENTORS
R. J. WISE
G. H. RIDINGS
BY
ATTORNEY

INVENTORS
R. J. WISE
G. H. RIDINGS
BY A. H. Thomas
ATTORNEY

Feb. 5, 1952

R. J. WISE ET AL 2,584,775

FACSIMILE TRANSMITTER AND RECORDER WITH AUTOMATIC SHEET MOUNTING

Filed Dec. 10, 1946

10 Sheets-Sheet 6

INVENTORS
R. J. WISE
G. H. RIDINGS

BY A. H. Thomas

ATTORNEY

Feb. 5, 1952

R. J. WISE ET AL

FACSIMILE TRANSMITTER AND RECORDER WITH AUTOMATIC SHEET MOUNTING 2,584,775

Filed Dec. 10, 1946

10 Sheets-Sheet 7

INVENTORS
R. J. WISE
G. H. RIDINGS

BY A. A. Thomas
ATTORNEY

Feb. 5, 1952 R. J. WISE ET AL 2,584,775

FACSIMILE TRANSMITTER AND RECORDER WITH AUTOMATIC SHEET MOUNTING

Filed Dec. 10, 1946

10 Sheets-Sheet 8

INVENTORS
R. J. WISE
G. H. RIDINGS

BY A. A. Thomas

ATTORNEY

INVENTORS
R. J. WISE
G. H. RIDINGS
BY A. A. Thomas
ATTORNEY

INVENTORS
R. J. WISE
G. H. RIDINGS
BY A. A. Thomas
ATTORNEY

Patented Feb. 5, 1952

2,584,775

UNITED STATES PATENT OFFICE 2,584,775

FACSIMILE TRANSMITTER AND RECORDER WITH AUTOMATIC SHEET MOUNTING

Raleigh J. Wise, Dunellen, and Garvice H. Ridings, Summit, N. J., assignors to The Western Union Telegraph Company, New York, N. Y., a corporation of New York Application December 10, 1946, Serial No. 715,248

44 Claims. (Cl. 346—74)

This invention relates to the art of facsimile communication and its object is to provide an automatic facsimile transmitter or receiver embodying various novel features which result in certain practical advantages in the commercial use of the machine. Since the drawings show our invention embodied in a recorder, we shall describe it as such without intending thereby any limitation in the practical application of our invention.

Briefly stated, our new facsimile recorder comprises a stationary cylinder on which the paper blanks are supported for recording. This paper, which is especially prepared for electric recording, is fed from a continuous supply roll in a direction lengthwise of the cylinder. After a definite length of paper has been fed into alignment with the cylinder, shears cut the paper and a flexible former wraps the cut blank around the cylinder and holds it there. The blank is moved slowly along the cylinder while a revolving electric stylus records on the inner surface of the paper as it slides off the stationary cylinder. At the end of a recording operation the flexible former or wrapper opens to release the received message which is thereupon removed. All these operations from the feeding of the blank to the removal of the recorded sheet take place in automatic sequence, so that the machine requires no personal attention in the successive recording of transmitted messages. The machine does not even have to be started and stopped by an attendant. These operations are automatically controlled from the transmitter with which the recorder is connected.

The flexible former that wraps the cut blank around the cylinder comprises a pair of pivoted arms which carry a flexible band. These arms are normally open to hold the band flat for receiving one blank length of paper as it comes from the supply roll. After the paper is cut, the arms close and wrap the blank firmly around the cylinder. In one form of our invention the former is mounted on a slidable carriage and draws the supported sheet off the cylinder during the scanning operation. For extra long sheets we provide additional means for maintaining the cylindrical form of the paper as it leaves the stationary cylinder. The recorded sheets are removed from the flexible former by an automatic stripping device which carries the sheet to a position where it drops into a receptacle.

In another embodiment of our invention the flexible former that wraps the cut blank around the supporting cylinder remains stationary during the scanning operation and the blank is pulled off the cylinder by a gripping device mounted on a slidable carriage. In this construction no matter how long the sheet is it remains supported at both ends in cylindrical form during the entire forward movement of the carriage. This gripping device is operated automatically to grip the sheet after it has been wrapped around the cylinder and to release it at the proper moment after the recording is finished. In this machine the recorded sheets are removed by pneumatic device which carries them to a point of discharge.

In its practical application our facsimile recorder is useful in any telegraphic communication system requiring automatic operation in the recording of transmitted subject matter such as telegrams, letters, business forms on cards or sheets, and all kinds of records used in business transactions. Several examples of our invention are shown in the accompanying drawings in which Fig. 1 shows one form of our facsimile recorder in perspective;

Figures 1, 2, 3:
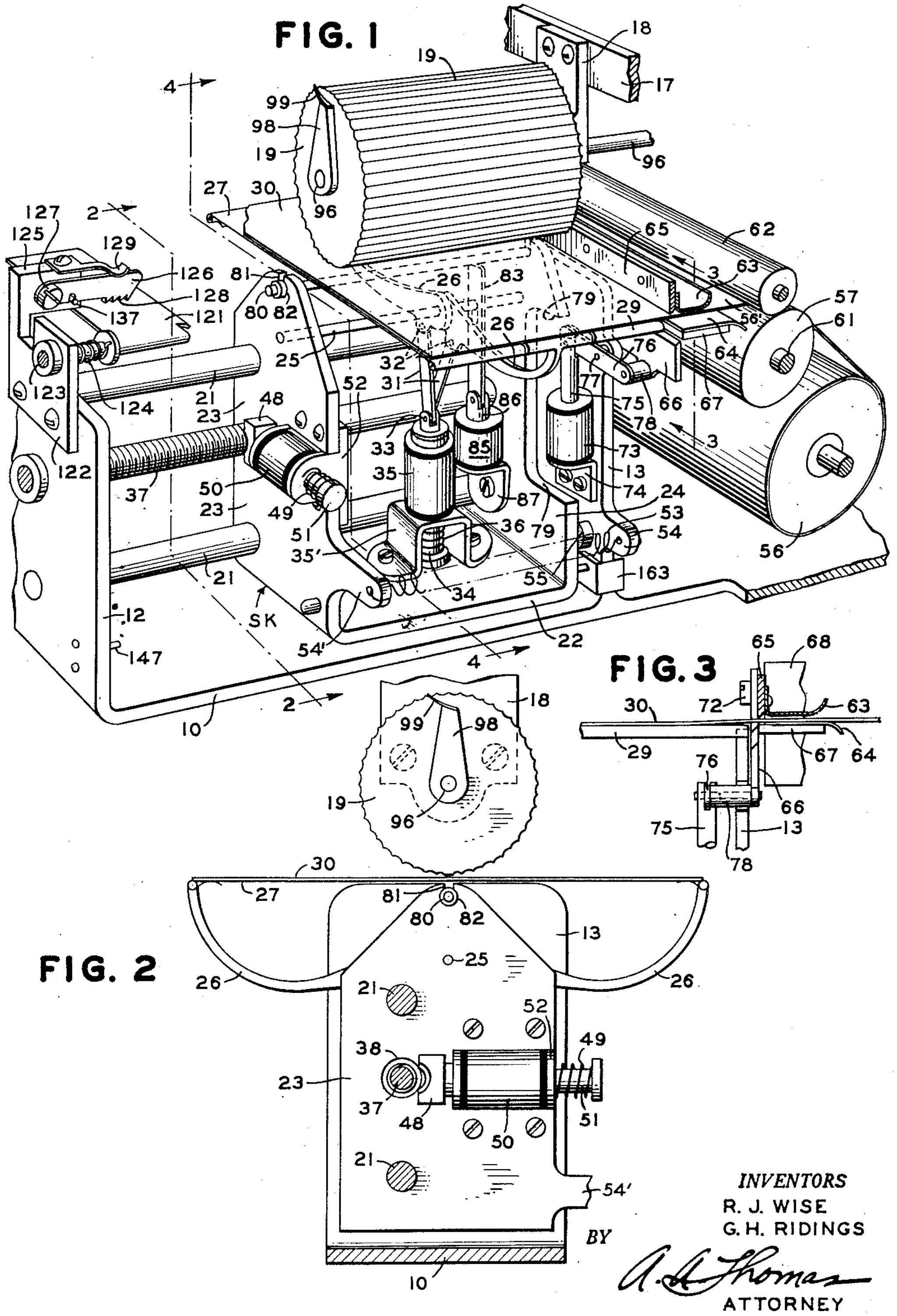
Fig. 2 is a transverse section on line 2—2 of Fig. 1.
Fig. 3 is a fragment of Fig. 1 showing a front view of the blank cutting mechanism, as if looking along line 3—3 of Fig. 1, certain parts being sectioned for clearness.
Figure 4:
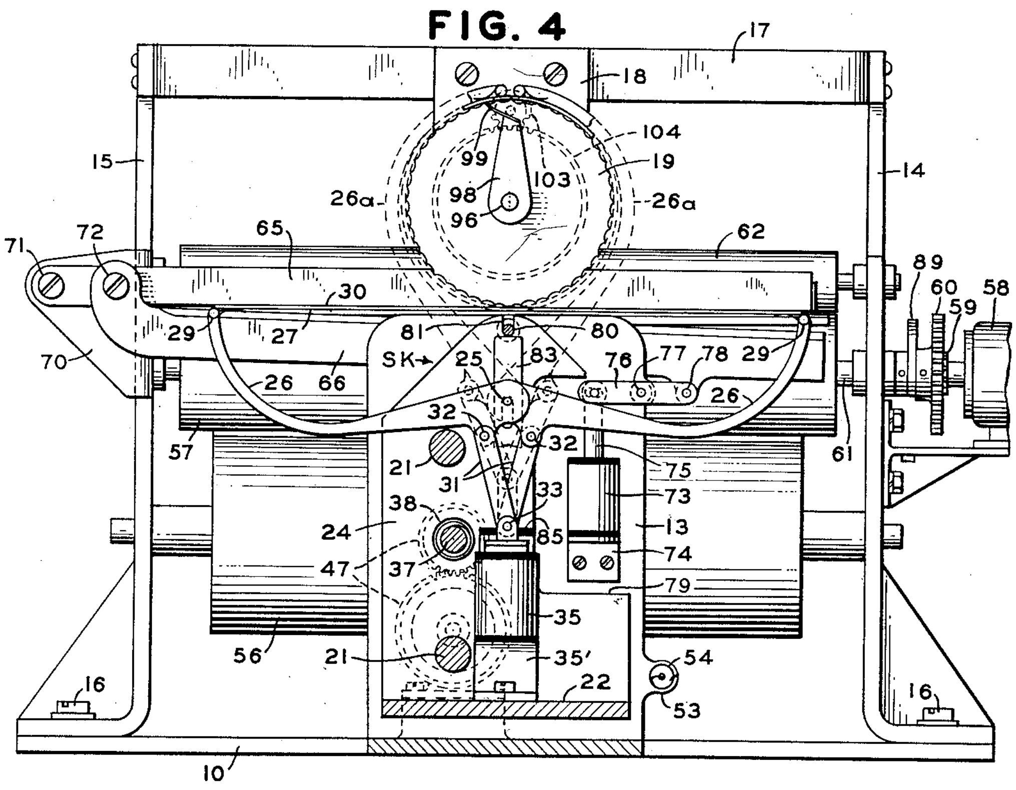
Fig. 4 is a cross section on line 4—4 of Fig. 1.
Figure 5:
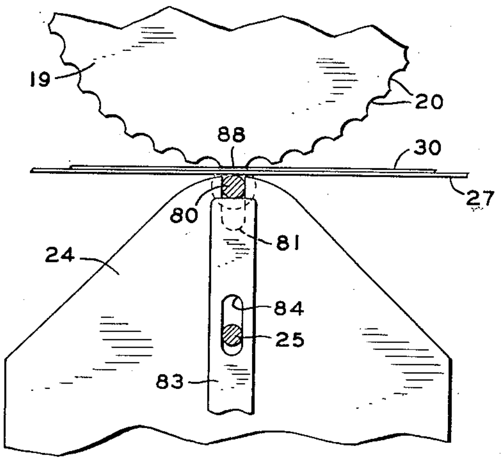
Fig. 5 is an enlarged view of a portion of Fig. 4 showing a recording blank pressed against the cylinder during the cutting operation.
Figures 6, 7, 7A, 8:
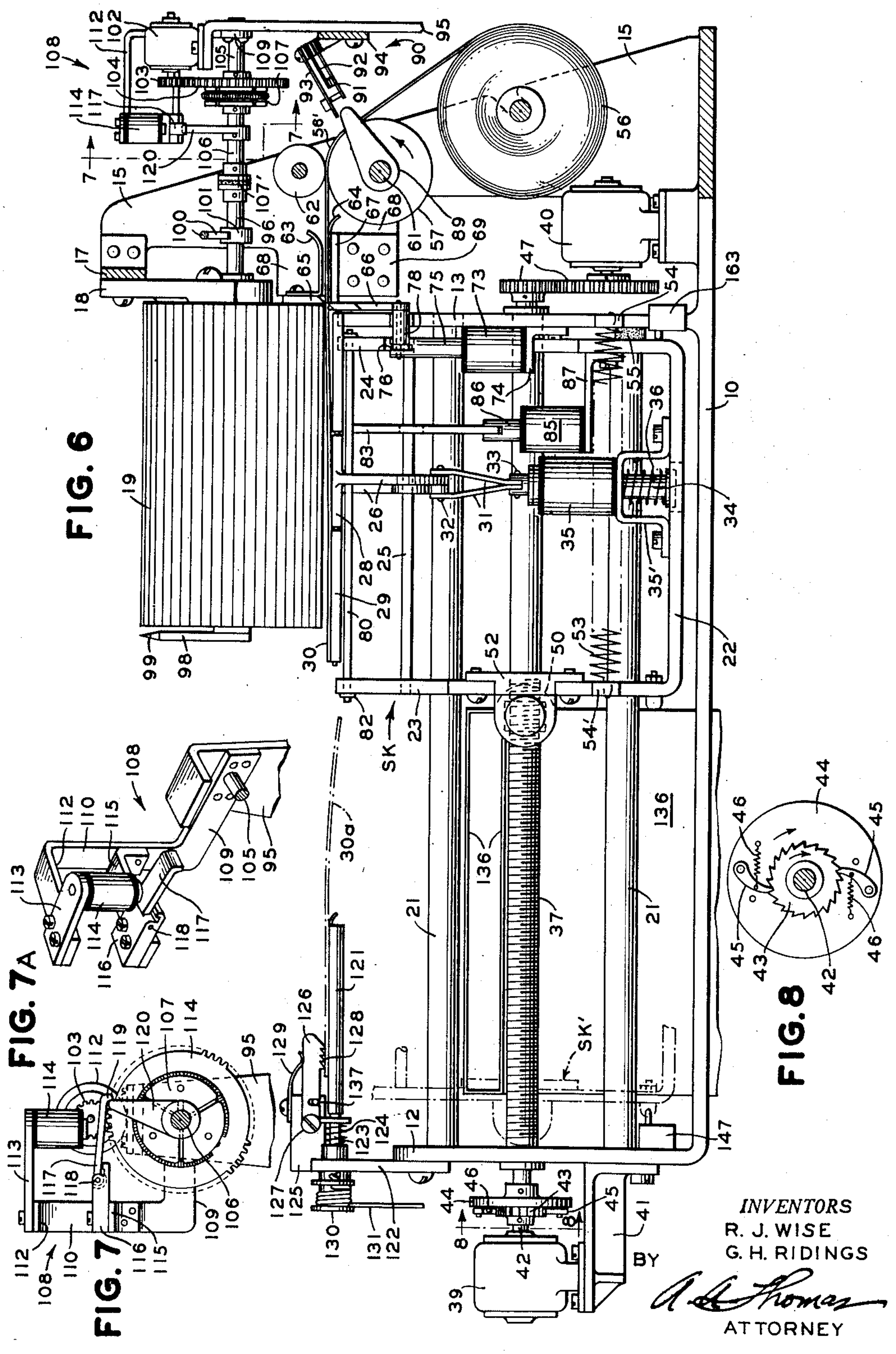
Fig. 6 shows a side view of the machine.
Fig. 7 is a section on line 7—7 of Fig. 6.
Fig. 7A represents a detached perspective view of the complete bracket shown in Fig. 7.
Fig. 8 is a section on line 8—8 of Fig. 6.

Referring mainly to Figs. 1, 4 and 6, the supporting framework of the machine comprises a base 10, a pair of vertical cross plates 12 and 13, and a pair of front and rear upright brackets 14 and 15 at the right end of the machine. The cross plates 12 and 13 may be cast integral with the base 10 and the brackets 14 and 15 are fastened to the base by screws or bolts 16. The brackets 14 and 15 support a cross bar 17 at the top and a depending bracket 18 secured to the middle of the cross bar carries a stationary drum or cylinder 19 which extends lengthwise of the machine. The function of the drum 19 is to support a sheet of paper in recording position, the wrapped sheet being slowly moved along the drum during this operation, as will be fully explained later. To reduce contact friction between the sliding paper and the stationary drum, the latter may be formed with longitudinal grooves 20, as best shown in the enlarged view of Fig. 5.

*Scanning carriage and driving connections (Figs. 1 to 6 and 8)*

The cross plates 12 and 13 support a pair of horizontal rods 21 which are fixed in vertical alignment for slidably supporting a scanning carriage SK. This carriage comprises a U-shaped frame 22 provided with side plates 23 and 24 which are mounted on the rods 21 for reciprocating operation of the carriage. To insure a smooth easy movement of the carriage the side plates may have rollers running on rods 21. As this expedient is well known, we do not show the rollers. A rod 25 mounted at its ends on the side plates 23 and 24 has pivoted thereon a pair of arms 26 which extend in opposite directions and carry at their tips a flexible band 27 of suitable material, such as metallized cloth or rubber, very thin sheet metal, or the like.

A simple way to attach the band 27 to the pivoted arms 26 is to provide the tips of the arms with short lateral sleeves 28 (Fig. 11) which carry rollers 29 to which the ends of the band are fastened in any practical way. The pivoted arms 26 and the flexible band 27 constitute a flexible former or wrapper adapted to wrap a blank around the stationary cylinder 19 and hold it in position for recording. The band 27 is about the size of a recording blank 30, as seen best in Fig. 1. For convenience we shall refer to the flexible band 27 as the former or wrapper.

The pivoted arms 26 are operated through a pair of links 31 which are pivotally connected to the arms by pins 32 on opposite sides of the central pivot mounting 25. The lower ends of links 31 are connected to a pin 33 on the movable plunger 34 of a solenoid 35 which is mounted on an inverted U-shaped bracket 35' secured to the base of the U-shaped frame 22. An expanding coil spring 36 surrounds the plunger 34 and normally tends to pull the arms 26 down into open position, as shown in Figs. 1 and 4. When the magnet 35 is energized, the plunger 34 is pulled up and the arms 26 are raised to their closed position 26a (see Fig. 4), thereby wrapping the flexible band 27 around the cylinder 19. It will be convenient to refer to 35 as the wrapping magnet. The timed operation of this magnet will be explained in the description of Fig. 12.

The sliding movement of carriage SK for scanning is effected by a rotary screw shaft or feed screw 37 which is journaled at its ends in the cross plates 12 and 13, as shown in Fig. 6. The side plates 23 and 24 of the carriage have holes 38 for the free passage of the screw shaft therethrough. In this particular design of machine we use two motors for operating the screw shaft 37, as seen in Fig. 6. A motor 39 at the left of the machine rotates the shaft 37 at low scanning speed, which may be called the normal speed of the shaft. A second motor 40 at the other end of the machine operates the screw shaft at high speed during certain intervals for a purpose to be explained later.

The scanning motor 39, which is a synchronous motor of predetermined constant speed, is mounted on a bracket 41 secured to the cross plate 12. The motor shaft 42, which is preferably in axial alignment with the feed screw 37, has fixed thereon a ratchet wheel 43. On the adjacent end of the feed screw 37 is rigidly mounted a disk 44 which carries a pair of pivoted pawls 45 arranged to engage the ratchet wheel (Fig. 8). Light springs 46 constantly hold the pawls 45 against the ratchet teeth whereby the screw shaft 37 is coupled to the motor shaft 42 and rotates in unison therewith, as indicated by the arrows in Fig. 8.

The high speed motor 40, which may be mounted on the base 10, is connected to the screw shaft 37 through suitable gearing 47. This drives the screw shaft at a predetermined high speed to move the scanning carriage quickly to the end of its forward travel, as indicated by the fragmentary dotted outline SK' in Fig. 6. As the motor 40 is permanently geared to the screw shaft 37, its armature shaft will be rotated by the motor 39 during the scanning periods, but that slow turning of its armature will do the motor 40 no harm. We may cut the scanning motor 39 out when the motor 40 is operating or we may let it run continuously after the machine is started. Simultaneous operation of the two motors is permitted by the pawl and ratchet coupling 43—44 because the high speed disk 44 simply overruns the low speed ratchet wheel 43.

The scanning carriage SK is connected to the screw shaft 37 by a half nut 48 (Fig. 2) which is held clear of the shaft by an expanding coil spring 49 and is moved into mesh with the shaft by a magnet 50 when the latter is energized. The half nut 48 may be attached directly to the end of the plunger 51 of the magnet or otherwise connected thereto, and the coil spring 49 is mounted on the plunger. The magnet 50 is carried by a bracket 52 secured to the side plate 23 of the scanning carriage. A contracting coil spring 53 is secured at one end to a lug 54 on the stationary cross plate 13 and at the other end to a lug 54' on the plate 23 on the scanning carriage SK. When the carriage has completed its travel leftward (as viewed in Fig. 6) the magnet 50 is automatically released and the spring 49 withdraws the half nut 48, whereupon the tension of spring 53 snaps the released carriage back to starting position. The timing of magnet 50 will be explained in connection with Fig. 12. Suitable cushioning means, such as rubber pads or buttons 55, absorb the shock of the returning carriage.

*Paper feed and cutting mechanism (Fig. 1 to 6)*

The blanks 30 which are wrapped around the cylinder 19 by the flexible former 27 are fed from a continuous supply roll 56 which is mounted transversely of the machine in the brackets 14 and 15. The paper roll 56 may be any kind of facsimile paper adapted to be recorded on by an electric stylus. A feed roll 57 also mounted in the brackets 14 and 15 is driven by a motor 58 (see Fig. 4) through suitable reducing gears, such as a worm or pinion 59 on the motor shaft meshing with a large gear 60 fixed on the feed roll shaft 61. A pressure roller 62 journaled in the brackets 14 and 15 assures proper feeding of the paper in a continuous sheet or strip 56' when the motor 58 is running. The circumference of the feed roll 57 is such that one turn will feed the correct length of paper 30 onto the open band 27 under the scanning cylinder 19. Let it be noted that 30 indicates the paper blank to be wrapped around the cylinder 19, while 56' refers to the continuous strip of paper which is fed off the supply roll 56.

Since the paper is fed from a continuous roll, it is necessary to cut off the required length before it can be wrapped around the cylinder by the former 27. As the paper strip 56' emerges from the feed rolls 57 and 62, it passes between two transverse guide strips 63 and 64 which direct the paper through the gap of a pair of open shear blades 65 and 66 onto the flat open band 27 beneath the cylinder 19. A bed plate 67 is secured at one end to an extension 68 of bracket 15 as by means of a flange 69 which is welded or riveted to the bracket. The lower guide member 64 is mounted on top of the bed plate 67 and the upper guide member 63 is fastened to the upper shear blade 65. This blade is stationary and is secured to a lateral extension 70 of bracket 15 by bolts 71 and 72 (Fig. 4). The lower or movable blade 66 is pivoted on the bolt 72. This blade hangs normally in open position by its own weight.

The fixed cross plate 13 carries a magnet or solenoid 73 which is mounted in vertical position on an angle bracket 74 screwed to the plate. The plunger 75 of this magnet is connected to one end of an arm 76 which is pivoted at 77 to the plate 13. The other end of arm 76 is connected at 78 to the lower shear blade 66. It is clear from Fig. 4 that when the magnet 73 is energized, the arm 76 is rocked to swing the blade 66 upward against the fixed blade 65 and thereby cut off the paper that was fed to the open band 27. This severed length of paper constitutes the recording sheet or blank 30 which is now ready to be wrapped around the cylinder 19. In the particular machine we are describing the side plate 24 of the scanning carriage is cut away to provide a recess 79 (Fig. 1) so as to make room for the cutting magnet 73.

It is necessary to hold the paper firmly against movement during the moment of cutting so as to obtain a clean even cut. For this purpose there is a rod 80 movably mounted in vertical slots 81 at the top of the carriage plates 23 and 24. This rod is arranged centrally below the cylinder 19 and is held against axial displacement by collars 82 which do not interfere with its vertical movements. A vertical bar 83 is mounted below the rod 80 in such position that normally the top of the bar just touches the rod. The bar 83 has a slot 84 (Fig. 5) through which the fixed rod 25 passes, whereby the bar is guided in its vertical movements.

A magnet or solenoid 85 has a plunger 86 to which the lower end of the bar 83 is connected A bracket 87 mounted on the side plate 24 supports the magnet 85. When this magnet is energized, the plunger is raised and the bar 83 lifts the rod 80 upward in the slots 81. As a result the paper on the band 27 is pressed by the rod 80 firmly against the bottom edge 88 of the cylinder 19 (Fig. 5) during the time that the shear blade 66 is operated to cut the paper. When the cutting is finished, the magnet 85 is deenergized and the parts 80, 83 and 86 return to their normal inactive positions.

It should be understood that the paper cutting operation occurs at the end of the feeding operation by the motor 58 which is disconnected before the shear blade 66 moves up. The circuit of motor 58 is controlled by an arm 89 fixed on the feed shaft 61 (Fig. 6). This arm operates a switch device 90 comprising a pair of normally closed contacts 91 and 92 and a weighted spring blade 93 which extends into the path of arm 89. The switch device 90 may be mounted as an insulated unit on a cross bar 94 carried by a vertical bracket 95 which rises from the base plate 10. It is clear from Fig. 6 that as the arm 89 moves past the spring blade 93 it tensions the latter and allows it to snap back. The recoiling blade 93 strikes the contact 91 and opens the switch for a moment. How the opening of switch 90 stops the feeding of the paper after one revolution of the feed roll 57 will be explained in the description of Fig. 12.

*Recording and phasing mechanism (Figs. 6, 7, 7A and 11)*

Figure 11:
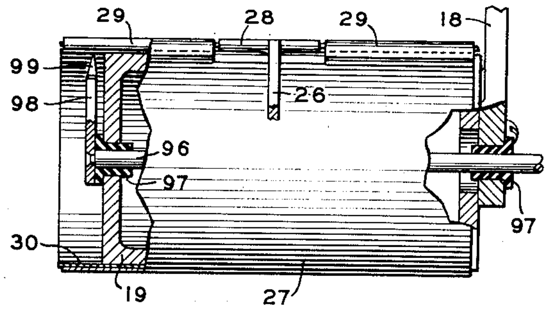
Fig. 11 is a fragmentary detailed view partly in section showing the mounting of the rotary recording stylus.
Figure 10:
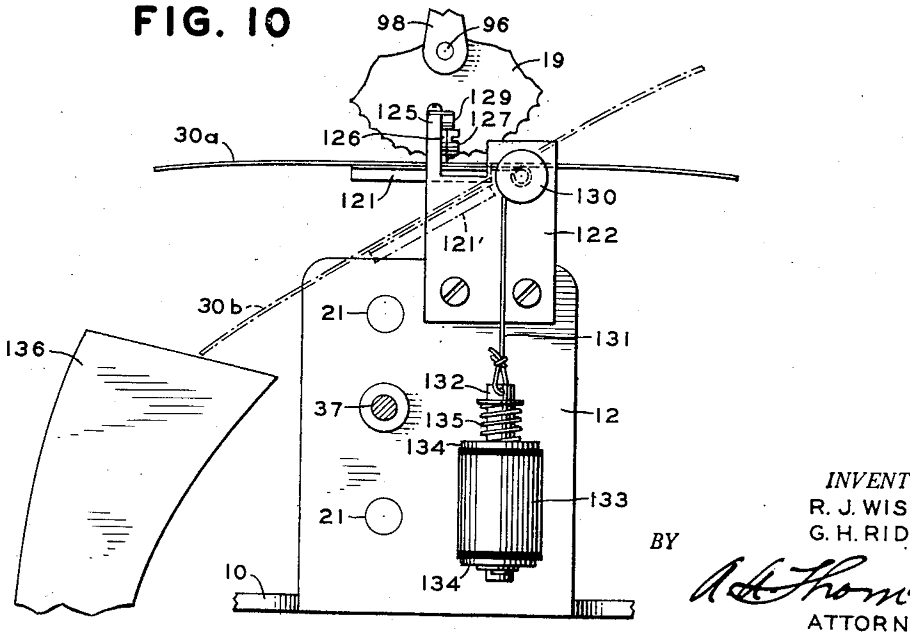
Fig. 10 is a left end view of Fig. 1 showing how a recorded sheet is removed from the machine.

Referring to Fig. 11, a rotary conducting shaft 96 passes centrally through the stationary cylinder 19 and is insulated by rubber bushings 97, which also serve as bearings. A metal arm 98 is fixed on the outer end of shaft 96 and carries a recording stylus 99 of suitable construction, such as a piece of wire soldered in place. The stylus 99 is so arranged that it rotates in a circular path close to the adjacent end of the cylinder and remains in continuous contact with the inner surface of the supported sheet 30 as the latter is slowly moved along the cylinder by the scanning carriage SK. The insulated stylus shaft 96 is connected in the signal circuit in any practical way, as by a brush 100 engaging a collector ring 101 on the shaft (Fig. 6).

The stylus shaft 96 is driven at a predetermined constant speed by a small synchronous motor 102 (Fig. 6) mounted on top of the upstanding bracket or post 95. A worm or pinion 103 on the shaft of motor 102 meshes with a gear wheel 104 fixed on a countershaft 105 which connects with an aligned stub shaft 106 through a suitable friction clutch 107, which may be of any well-known construction. The stub shaft 106 is connected to the aligned stylus shaft 96 through an insulated coupling 107' whereby the stylus shaft is insulated from the machine. The axially aligned shafts 105, 106 and 96 thus constitute a rotary driving connection for the recording stylus 99 from the motor 102. This driving connection is controllable for phasing purposes as we shall now explain.

An angle bracket indicated as a unit by 108 (see Fig. 7A) is attached to the upper part of the supporting post 95 and comprises a horizontal base part 109 which is secured to the post, a vertical extension 110 and a horizontal top piece 112 projecting laterally from 110. These parts may be formed from a single piece of sheet metal. To the top piece 112 is attached a bar 113 extending at right angles to the top piece and carrying a magnet 114 which we call the phasing magnet. An angle bar 115 projecting laterally from the vertical part 110 carries a plate 116 to which a latch 117 is hinged by a pin 118.

The latch 117 extends slightly below the magnet for which it acts as an armature. The free end 119 of latch 117 is hook-shaped and normally projects into the path of an arm 120 on the stub shaft 106. This shaft, therefore, remains locked as long as the latch 117 is hooked to the arm 120. When the magnet 114 is energized it pulls up the latch 117 and frees the arm 120, so that the stylus shaft 96 starts to rotate. The friction clutch 107 permits the rotation of shaft 105 by motor 102 while the shaft 106 is locked. The latch 117 drops into locking position upon release of magnet 114.

*Automatic mechanism for removing recorded sheets (Figs. 1, 6, 9 and 10)*

In a machine of this type which operates to make facsimile recordings in a series of sheets in automatic sequence, it is necessary to clear the scanning carriage of each recorded sheet before the carriage returns for the next recording. This cannot be done by hand because the carriage remains in final position only a moment. We have, therefore, devised automatic mechanism for stripping the recorded sheets from the scanning carriage as it starts on its return trip to receive the next blank.

Figure 9:
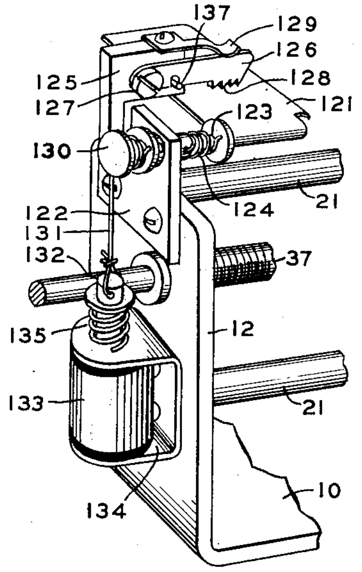
Fig. 9 shows the sheet removing device mounted at the left of Fig. 1 where it is partly broken away.

Referring particularly to Fig. 9 which represents the left end of the machine in Fig. 1, there is a platform 121 mounted on a bracket 122 which is secured to the cross plate 12. The platform 121 carries a pin 123 at one end and this pin is journalled in bracket 122 so that the platform can swing down toward the back or far side of the machine (as viewed in Fig. 1). A coil spring 124 normally holds the platform in horizontal position. The bracket 122 has an extension 125 on which a stripping finger 126 is pivoted at 127. The front portion of finger 126 has teeth 128 which are constantly pressed down on the platform 121 by a light spring 129 mounted on the extension 125. It is convenient to have this extension form a stop for holding the platform horizontal under the action of spring 124. The platform 121 and the finger 126 are in a central position with respect to cylinder 19 and scanning carriage SK.

The platform 121 is so arranged that the flexible band 27 carrying the recorded sheet rides onto the platform as the scanning carriage approaches the end of its forward travel. The front edge of finger 126 and its pointed teeth 128 slant rearward so that the finger is easily pushed up by the advancing band and sheet. However, when the carriage SK starts to return under the action of spring 53, the pointed teeth 128 hold back the recorded sheet and thus strip it from the carriage, as indicated by the dotted outline 38a in Fig. 6.

The stripped sheet could be removed by an attendant by simply lifting the finger 126, but we prefer to discharge the sheet automatically from the platform into a receptacle. The left end of pivot pin 123 carries a small pulley 130 on which is wound a cord or thin wire 131, which is tied to the plunger 132 of a solenoid 133 supported on the cross plate 12 by a bracket 134. An expanding coil spring 135 surrounding the plunger 132 holds the latter up. When the magnet 133 is energized, the platform 121 is rocked down to position 121' in Fig. 10 and the stripped sheet 38a is tilted to position 38b from which it drops into a suitable receptacle 136. During the tilting of platform 121, the finger 126 is held back by a pin 137, so that the sheet is released from the teeth 128 and is free to slide off.

Figure 12:
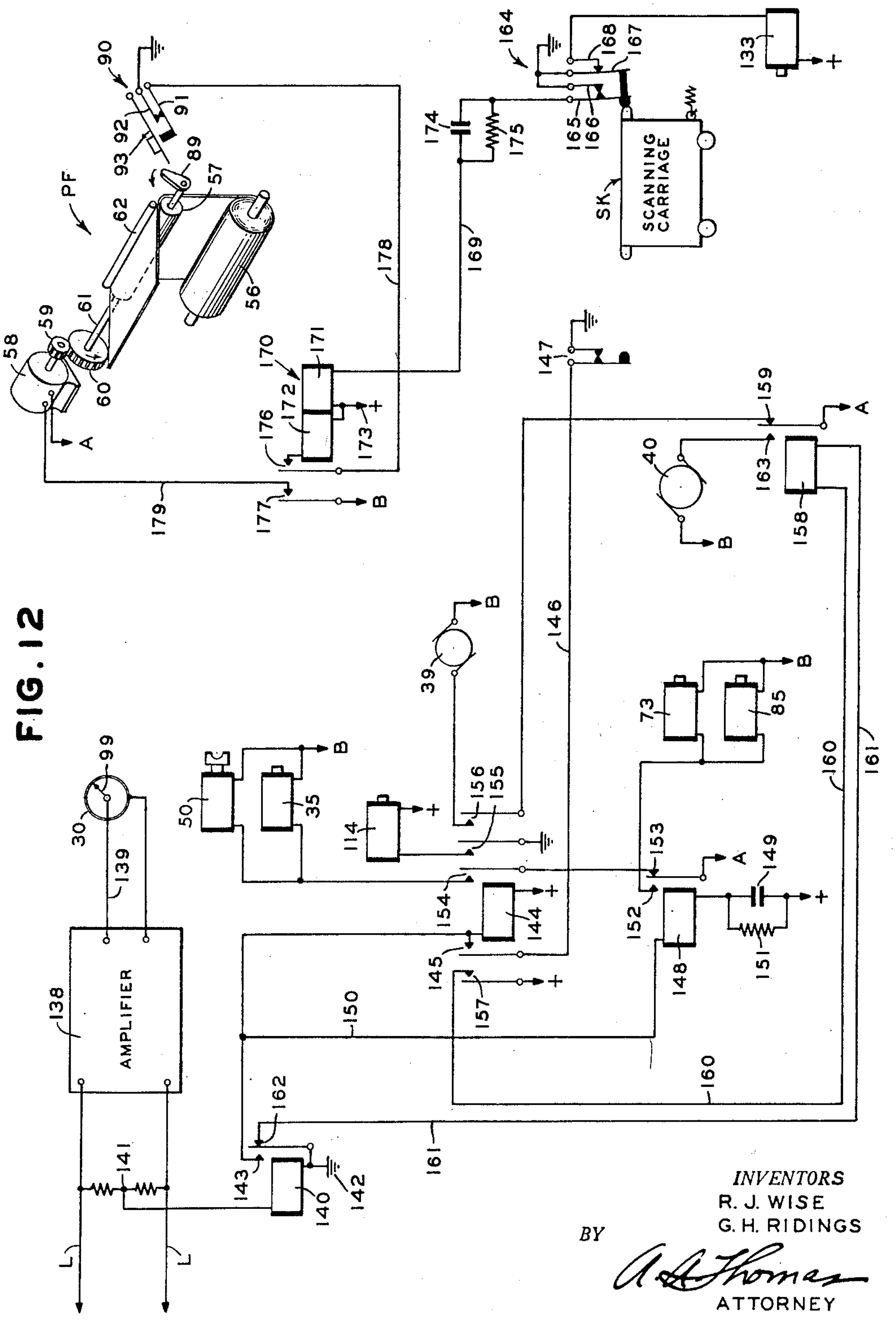
Fig. 12 is a diagram of the control circuits for the automatic operation of the machine shown in Figs. 1-11.

*Control circuits of Fig. 12*

In considering the wiring diagram of Fig. 12, we shall assume that the incoming facsimile signals are received over a transmission line L which connects the recorder with any suitable transmitter. For example, our new recorder and its control circuits can be used in conjunction with a transmitter like that shown in Fig. 1 of our Patent No. 2,255,869, issued September 16, 1941.

The received facsimile signals are transmitted from line L to a suitable amplifier 138. The output of this amplifier constitutes the recording circuit 139 (shown in simplified form) which includes the electric stylus 99. There are two sources of power indicated in Fig. 12. The letters A and B represent the bus bars of a source of alternating current, such as a 115-volt 60-cycle generator. Therefore, it will be understood that any contact or conductor marked "A" goes to one bus bar of a power line and the conductors marked "B" go to the other bus bar. The second source of power used in Fig. 12 is a D. C. or battery circuit, which is indicated by a plus sign (+) for the positive pole and by the usual ground symbol for the negative pole.

A relay 140 is connected at one side across the transmission lines L at a midway point 141 and the other side of the relay is grounded at 142. For transmission of the message battery is applied over the lines L at the transmitter thereby energizing the relay 140 which closes its front contact 143. This closes the battery circuit of a relay 144 which locks through its make contact 145, conductor 146 and a closed switch 147. This switch is always closed except when it is opened for a moment by the scanning carriage SK at the end of its forward movement.

The closing of contact 143 by the energized relay 140 also energizes a relay 148 through a condenser 149 and line 150 which goes to ground through relay contact 143. The condenser 149 is in series with the winding of relay 148 and is shunted by a resistor 151 of relatively high value such that current through the resistor alone will not permit operation of relay 148. It is clear that the relay 148 is energized only for the charging time of the condenser 148, say about one or two seconds.

This momentary energizing of relay 148 closes its front contact 152 and breaks its back contact 153. The closed contact 152 operates the cutting magnet 73 and the holding magnet 85 through the source of power represented by A—B. This cuts off the blank length of paper 30 which has previously been fed onto the open wrapper 27 beneath the cylinder 19. The relay 148 is energized just long enough for the completion of the cutting operation.

Although the relay 148 is energized only for a second or two, the relay 144 remains locked in energized condition and holds all its contacts 145, 154, 155, 156 and 157 closed. Therefore, when the relay 148 is released and closes its back contact 153, the AC power circuit of the half-nut magnet 50 and the wrapping magnet 35 is completed through the closed contact 154 of relay 148. In other words, immediately after the paper has been cut off it is wrapped around the cylinder 19 by operation of the magnet 35, and at the same time the energized magnet 50 throws the half-nut 48 into mesh with the feed screw 37.

The closing of relay contact 155 operates the phasing magnet 114 to release the stylus 96, and the closing of contact 156 energizes the low speed motor 39 to operate the feed screw 37. It is thus seen that the energizing of relay 144 automatically cuts off a blank length of paper from the continuous roll 56, wraps the severed sheet around the stationary cylinder 19, starts the rotation of stylus 99 and sets the scanning carriage SK in motion to carry the sheet along the cylinder for the recording of signals that pass through the stylus.

There is a relay 158 which is never energized during the recording intervals. Therefore, at such times its contact 159 remains closed to keep the low speed motor 39 energized. One side of relay 158 goes by way of a conductor 160 to contact 157 of relay 144 and the other side of relay 158 is connected by a line 161 to the back contact 162 of relay 140. Since the relay 140 is kept energized during the transmission of a message, the contact 162 remains open and the relay 158 is held inactive even though the contact 157 is closed.

At the end of a message, the transmitter removes battery from line L and thus releases the relay 140, as explained in our Patent No. 2,255,869, previously mentioned. The opening of contact 143 has no effect on relay 144 because it is locked in energized condition through its contact 145 and the closed switch 147 controlled by the carriage SK. The closing of contact 162 of the released relay 140 operates the relay 158 to open its contact 159 and close its other contact 163. The opening of contact 159 cuts out the scanning motor 39 and the closing of contact 163 energizes the high speed motor 40.

At the end of a received message the carriage SK may or may not be at the end of its forward travel. Usually it will not be, because most messages written on telegram sheets do not extend down to the end of the sheet. So, let us say that when the end of the message is reached at the transmitter and battery is removed from the line relay 140, the carriage SK at the recorder has not yet reached the end of its forward travel. Therefore, when the high speed motor 40 is energized upon release of relay 140, the feed screw 37 is driven at a much higher rate than the recording speed and moves the carriage quickly forward to the end of its travel.

When the scanning carriage SK reaches its final position, it opens the switch 147 and breaks the circuit of relay 144 which in turn releases the relay 158 and stops the fast motor 40. At the same time, the wrapping magnet 35 is released to open the wrapper 27 and the magnet 50 is released to disconnect the half-nut 48 from the feed screw 37, whereupon the spring 53 quickly returns the carriage to starting position. During the return movement of the carriage the recorded sheet is withdrawn from the open wrapper 27 by the stripper 126, as previously explained.

The initial or starting position of the carriage SK controls a switch 164 which comprises two pairs of contacts 165—166 and 167—168. The contacts 165 and 167 are represented as spring arms which are normally out of engagement with their associated contacts 166 and 168. This means that the switch 164 is normally open and is closed only when the carriage is in starting position, for then the spring arms 165 and 167 are forced against their respective contacts, as shown in Fig. 12. Contact 165 is connected by a line 169 to one side of a double coil relay 170. Contacts 166 and 167 are grounded and contact 168 is connected to one side of magnet 133. The other side of this magnet goes to plus battery. With the closing of contact 168, the magnet 133 is energized to tilt the platform 121 (see Fig. 10) and allow the stripped recorded sheet 30a to drop off as previously explained.

In Fig. 12 we have indicated the paper feed mechanism as a whole by PF. The relay 170, which is part of this mechanism, has two windings 171 and 172 which have a common plus terminal 173. The line 169, which goes to winding 171, includes a condenser 174 which is shunted by a resistor 175 of high value (like the resistor 151) whereby the winding 171 is energized only for the charging time of the condenser. The relay 170 has two make contacts 176 and 177. The contact 176 is connected by a line 178 to the grounded switch 190, and the contact 177 is in the circuit wire 179 of the paper feed motor 58.

We now can see how the paper is automatically fed into the open former or wrapper 27 when the carriage is back in starting position. The closing of switch contacts 165—166 by the carriage energizes the relay winding 171 for a second or two and the relay 170 closes its contacts 176 and 177. The closing of contact 176 energizes the winding 172 and the relay locks through contact 176 and the closed switch 90. The closing of contact 177 energizes the motor 158 which drives the roll 57 one turn to feed a blank length of paper into the open former 27 under the cylinder 19. At the end of one turn of feed roll 57, the arm 89 opens the switch 90 whereupon the relay 170 is deenergized, thus breaking the circuit of motor 58. The machine is now ready for the next recording which begins with the energizing of line relay 140 from the transmitter as heretofore explained.

*Summary of operation (Figs. 1 to 12)*

The operation of our automatic facsimile recorder will be understood from the foregoing detailed description, but for the convenience of a quick review we append a summary of the steps that comprise the cycle of operation.

Let us assume that the power switch (not shown) has been closed so that the synchronous motor is running. The stylus 99 is not operating because its shaft 96 is held locked by the latch 117. The carriage SK is in starting position with a blank length of paper in the open former 27 under the cylinder 19. It should be remembered that this length of paper, which is still part of the continuous roll 58, was fed into the wrapper at the end of the preceding operation. The recorder is, therefore, in a ready-to-receive condition and is waiting for the signals from the transmitter at the other end of the transmission channel L.

When the transmitter is ready to send a message, battery is applied to the lines L over a simplex connection (as explained in our Patent No. 2,255,869), causing the relay 140 at the recorder to be energized. The closing of contact 143 of this relay simultaneously energizes the two relays 144 and 148. Whereas the relay 144 locks through its contact 145, the other relay 148 is energized only for a second or two. The energizing of relay 148 operates the magnets 73 and 85 to cut off the blank length of paper in the open former 27 by means of the shear blade 68.

The energizing of relay 144 accomplishes these results:

(1) The magnet 50 is energized to connect the carriage SK with the feed screw 37 and at the same time the magnet 35 is operated to close the wrapper 27 and wrap the severed sheet around the cylinder 19. It should be noted that this operation of magnets 35 and 50 does not take place until after the cutting operation when the relay 148 is released and closes its contact 153.

(2) The low speed motor 39 is energized and drives the feed screw 37 to which the carriage SK is now connected. In this particular machine the usual rate of speed at which the feed screw is driven is equivalent to 100 scanning lines per inch.

(3) The phasing magnet 114 is energized through the closed contact 155 of relay 144 to release the stylus shaft 96 and cause the recording stylus 99 to be phased from a phasing commutator at the transmitter.

The recorder is now operating to record the facsimile signals received by the electric stylus 99. We need not describe how the stylus makes a facsimile record of the transmitted copy on blank 30 because that operation is well known to those familiar with facsimile communication. It is enough to say here that the slow movement of the cylindrical sheet of paper along the stationary cylinder 19 by the scanning carriage SK causes the rapidly rotating stylus to trace on the inner surface of the paper a continuous spiral track (say 100 lines per inch) whereby an exact duplicate or facsimile of the transmitted copy is produced.

When the end of the message is reached in the transmitter, battery is removed from the simplex circuit at the transmitter whereby the relay 140 at the recorder is released, opening its contact 143 and closing its contact 162. The relay 144 remains energized through its contact 145 and the carriage controlled switch 147. The closing of contact 162 energizes the relay 158 which cuts out the slow speed motor 39 and energizes the high speed motor 40. Therefore the scanning carriage SK is moved quickly to the end of its forward travel where it opens the switch 147. The opening of this switch releases the relay 144 which in turn breaks the circuit of relay 158. The release of relay 144 deenergizes the magnets 35 and 50 so that the former 27 is opened and the carriage is released from the screw shaft 37. As the carriage is retracted by the spring 53, the recording sheet is stripped from the former 27 and momentarily held on the platform 121.

When the empty carriage is back in starting position, it closes the switch 164 and energizes the relay 178 which causes the motor 158 to feed a blank length of paper to the open former 27. At the same time the solenoid 133 is energized to tilt the platform 121 and allow the stripped sheet to drop into the receptacle 136. The machine is now ready for the next recording operation, thus recording a series of messages in automatic sequence as long as they keep coming from the transmitter.

*Modification of Figs. 13 to 16*

In the machine of Figs. 1 and 6, as the wrapped sheet is moved off the stationary cylinder 19 by the forward travel of the carriage SK, that portion of the sheet which leaves the cylinder is a cylindrical shell of paper without an inside support. Where the recording blanks are short, like ordinary telegram sheets, this lengthening cylindrical shell of paper will maintain its form even when only a narrow rear edge thereof remains on the supporting cylinder 19. However, in a machine requiring blanks of considerable length, it is necessary to support the paper at both ends during the entire forward movement of the scanning carriage to prevent collapse of the paper cylinder. Novel mechanism for accomplishing this result is shown in Figs. 13 to 16.

A hollow rod or tube 180 is rigidly supported on a plate or bracket 181 in axial alignment with the stationary cylinder 19 and the stylus shaft 96. A disk or short cylinder 182 is slidably mounted on the rod 180 and is normally held against a collar 183 at the free end of the rod by an expanding coil spring 184 wound on the rod. In this case the recording blank 185 and the flexible former 27 extend over the disk 182 when the blank is wrapped around the cylinder in the manner previously described. Although the sheet 185 in Fig. 13 appears to be no longer than the sheet 30 in Fig. 6, that is due to lack of space on the drawing sheets and it is to be assumed that the recording blank 185 is of such length as to require the support of the extra disk 182.

Figures 13, 14, 15, 16:
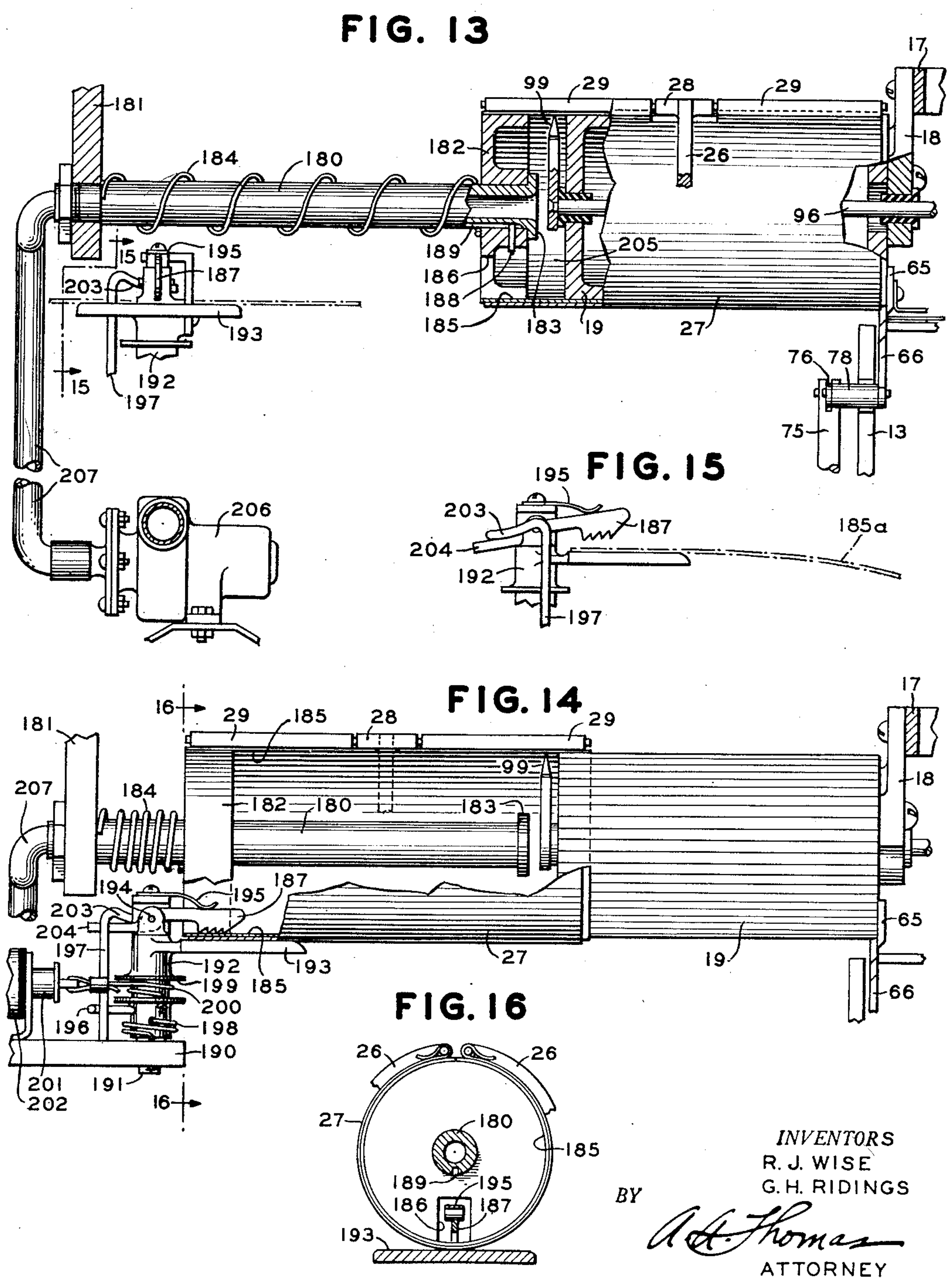
Fig. 13 shows a modified construction for supporting the sheet at both ends during the recording operation and for withdrawing the fumes generated by the stylus, the parts being shown in starting position.
Fig. 14 is similar to Fig. 13 with the parts shown at the end of a recording operation.
Fig. 15 is a detail on line 15—15 of Fig. 13.
Fig. 16 is a section on line 16—16 of Fig. 14.

It is clear by comparing Figs. 13 and 14 that the paper cylinder 185 is supported at both ends during the entire forward movement of the scanning carriage, whereby the fast revolving stylus 99 operates on a surface that remains a perfect cylinder throughout the entire recording operation. Since the slidable disk 182 is carried along by the closed former 27, it becomes in effect a part of the scanning carriage during the forward movement thereof. The compressed spring 184 returns the disk 182 to normal position against the collar 183 upon release of the carriage at the end of its forward travel, as explained in connection with Figs. 1 to 6.

The slidable disk 182 is cut away at the bottom to provide a slot 186 for permitting the passage of a sheet stripping finger 187 when the scanning carriage reaches the end of its forward movement. To maintain the slot 186 in line with the finger 187, the disk 182 is locked against rotary displacement in any practical way, as by a pin 188 on the disk engaging a longitudinal groove 189 in the tubular rod 180. The toothed stripper 187 operates precisely like the stripper 128 in Fig. 1 in pulling a sheet off the scanning carriage, but the mounting of the stripper is different, as we shall now describe in detail.

Referring to Fig. 14, a fixed horizontal arm or bracket 190 carries an upright pin 191 on which a sleeve or hub member 192 is pivoted. The sleeve 192 carries a small horizontal platform 193 over which the stripper 187 is pivoted on a pin 194. A light leaf spring 195 mounted on top of sleeve 192 presses the stripper 187 against the platform 193. A cross pin 196 on sleeve 192 normally engages a vertical rod 197 under the influence of a torsion spring 198 connected to the sleeve. The stops 196 and 197 are so arranged that normally they hold the stripper 187 and the platform 193 in axial alignment with the cylindrical recording sheet 185 as it approaches the stripper.

As will be understood from Fig. 14, after the finger 187 has entered the closed wrapper through the slot 186 in disk 182 at the end of the forward carriage movement, the sudden reverse movement of the carriage causes the teeth of stripper 187 to hold back the gripped sheet as the wrapper 27 (now open) slides off the platform 193 from under the sheet. This leaves the stripped sheet clamped to the platform by the spring pressed finger 187. We have provided automatic means for carrying the sheet on the platform to a position of removal.

The rotary sleeve or hub member 192 is provided with a pulley 199 on which a short piece of cord or thin wire 200 is wound. The outer end of this cord is connected to the plunger 201 of a solenoid 202 mounted on the bracket 190. The upper end of rod 197 is formed with a lateral cam lug 203 which lies over a rear extension or tailpiece 204 of the stripping finger 187. When the magnet 202 is energized it pulls its plunger 201 in and thereby swings the platform 193 forward through a right angle, as shown in Fig. 13. During this quarter turn of the sleeve 192 the tail 204 of the finger 187 rides under the cam lug 203 which causes the front or toothed end of the finger to rise and release the sheet, as illustrated in Fig. 15, where the released sheet 185a is ready to drop off the platform into a suitable receptacle. When the magnet 202 is released, the torsion spring 198 turns the sleeve 192 back to normal position as shown in Fig. 14. It is to be understood that the magnet 202 is controlled in the same way as the magnet 133 in Fig. 12.

We have referred to the shaft 180 as hollow or tubular, but in so far as the operation of the sheet supporting disk 182 is concerned, that shaft can be a solid rod. However, we use a hollow rod to accomplish an additional purpose. The recording operation of the electric stylus 99 produces fumes which might become objectionable if allowed to accumulate in the room where a number of machines of this type are operating. It is therefore desirable to remove those fumes as they are liberated. To this end we utilize the tubular rod 180 as a pipe for connecting the recording chamber 205 with a suitable suction device 206, which may be an exhaust fan driven by a motor. A pipe 207 connects the rear end of the hollow shaft 180 with the exhaust fan, which can be mounted in any convenient place on the framework of the machine or anywhere in the room.

It should be understood that the modified construction shown in Figs. 13 to 16 is intended for the machine illustrated fully in Figs. 1 to 11 and for that reason we have not considered it necessary to repeat in Figs. 13 to 16 such details of the machine as can be supplied from Figs. 1 to 11. The control circuits of Fig. 12 apply fully to a machine embodying the modification of Figs. 13 to 16.

*The modification of Figs. 17 to 22*

In the two machines of Figs. 1 and 13, the flexible former 27 that wraps the recording blanks around the stationary cylinder 19 is part of the reciprocating carriage SK and moves along with it to drag the wrapped sheet off the cylinder during the scanning operation. In the wider aspect of our invention this wrapper may be separate from the scanning carriage and remain stationary in closed position around the cylinder while the wrapped sheet is pulled from between the wrapper and the cylinder by a novel device mounted on the scanning carriage. A machine embodying that idea is illustrated in Figs. 17 to 22, which we shall now describe in detail.

Figure 17:
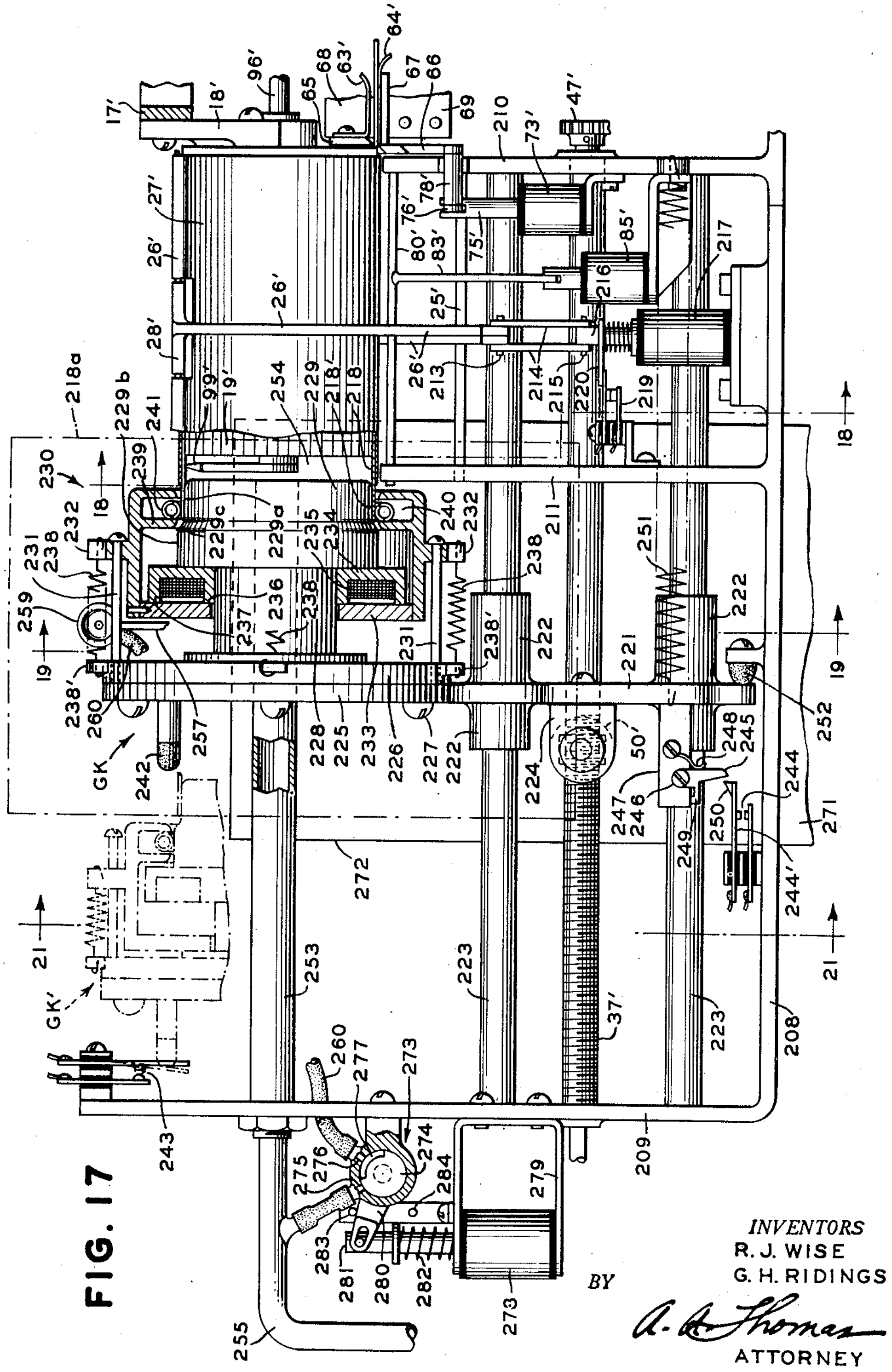
Fig. 17 shows another modification of our facsimile recorder, this being a side view of the machine with the parts in starting position.

The main framework of the machine comprises a base 208, an end plate 209 and a pair of short cross plates 210 and 211 which form a U-shaped supporting frame for several parts. It will not be necessary to describe every element shown in Fig. 17 because certain features of this machine are identical with corresponding features in the machine of Fig. 1. For example, the two machines have the same cutting mechanism, paper feed mechanism, stylus drive connections, feed screw drive, and other details that will be mentioned as we come to them. Therefore, to avoid needless duplication of description, such parts as are common to the machines of Figs. 1 and 17 are indicated by the same reference numerals except that a prime mark has been added to the numbers in Figs. 17 to 22 for distinction. Thus, for example, in Fig. 17 the cutting magnet 73′ and the holding magnet 85′ (which are both mounted on plate 210) take the place of the magnets 73 and 85 of Fig. 1. In other words, the previous description of Figs. 1 to 12 applies to Figs. 17 to 22 with respect to all common parts both as to structure and operation.

While the flexible wrapper or former 27′ in Fig. 17 is the same in structure and sheet wrapping function as the former 27 in Fig. 1, the difference is that the former 27′ is mounted to remain stationary during the recording operation. The rod 25′ on which the arms 26′ of former 27′ are pivoted is mounted in the fixed plates 210 and 211 of the framework. The wrapper arms 26′ have extensions 212 (see Fig. 18) which are connected by pins 213 to a pair of links 214 and these links are connected at 215 to the upper end of the magnetic plunger 216 of a solenoid 217. This device is secured in any practical way to the base plate 208 between the cross plates 210 and 211.

Figures 18, 19, 20:
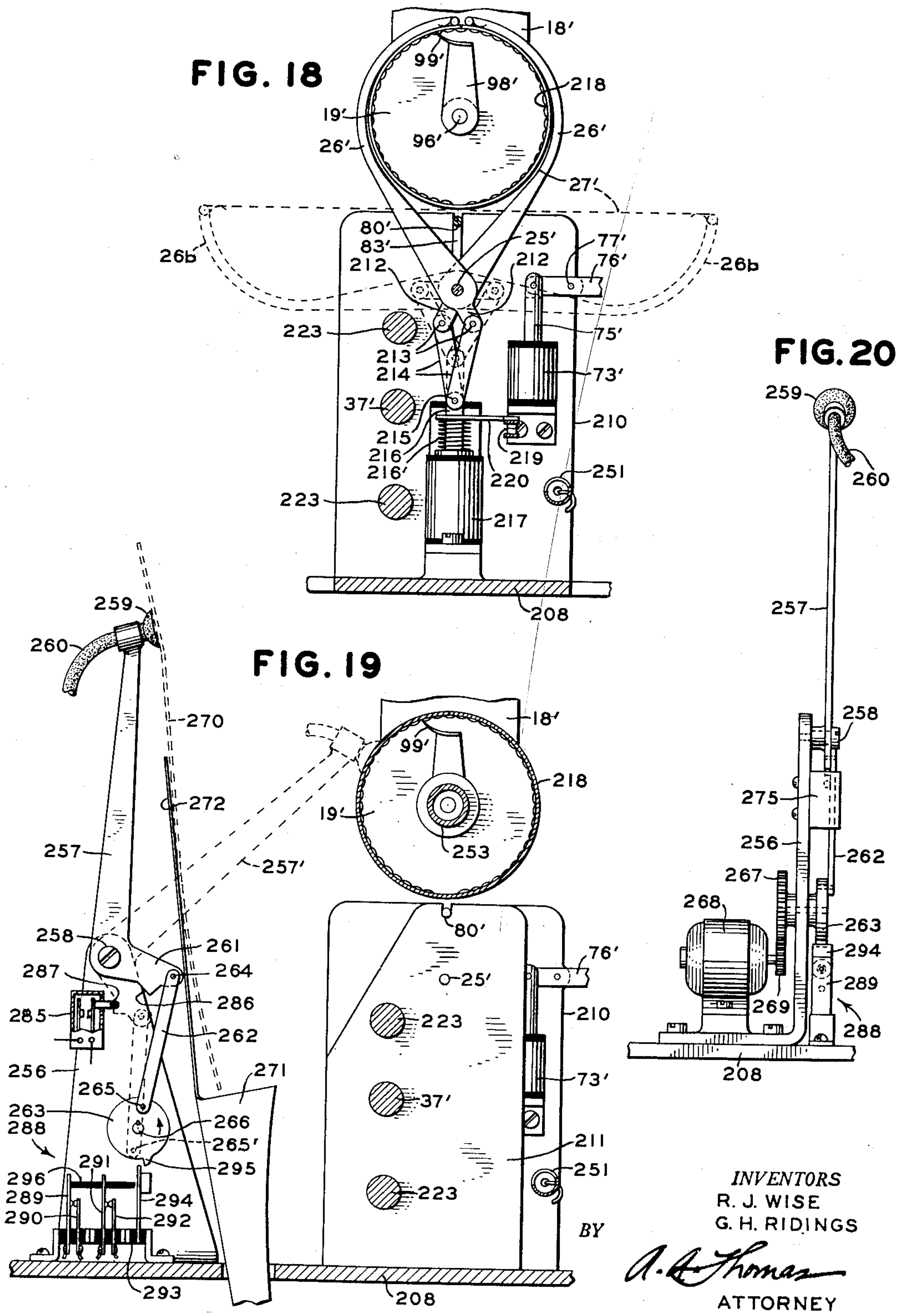
Fig. 18 is a cross section on line 18—18 of Fig. 17 showing the paper closed around the drum for scanning.
Fig. 19 represents a section on line 19—19 of Fig. 17 to illustrate the removal of a record sheet by pneumatic mechanism, it being assumed in this view that the scanning carriage is at the end of its forward travel.
Fig. 20 is a detached rear view of the sheet removing mechanism shown in Fig. 19.

An expanding coil spring 216′ normally pushes the plunger 216 up to hold the arms 26′ down in open position as indicated by the dotted lines 26b in Fig. 18. When the magnet 217 is energized, the core 216 is pulled down and the arms 26′ are swung up to wrap the severed blank 218 in the wrapper around the cylinder 19′. The movement of plunger 216 also controls a switch 219 mounted on plate 211. This switch is normally open and is closed by an arm 220 on plunger 216 when the latter is fully drawn down by the energized magnet 217. This means that the switch 219 is not closed until the sheet has been wrapped around the cylinder 19′. The reason for this will appear in the description of Fig. 23.

The salient feature of the machine illustrated in Figs. 17 to 22 is the scanning carriage which we have indicated as a unit by GK. This carriage comprises a vertical plate 221 provided with two bushings 222 by means of which the carriage is slidably mounted on a pair of rods 223 supported lengthwise of the machine in the end plates 209 and 210. These plates also support a rotary screw shaft 37′ which, like the screw shaft 37 of Fig. 6, is operated by a low speed motor for scanning and by a high speed motor for quick movement of the carriage to final position at the end of a scanning operation. These motors are not shown in Fig. 17 for lack of space, but they are indicated in the wiring diagram of Fig. 23 at 39′ and 40′ respectively, which correspond with the motors 39 and 40 of Figs. 6 and 12. The connection of the carriage GK with the feed screw 37′ is controlled by a half nut 48′ (Fig. 21) operated in the same way as the half nut 48 in Fig. 2. That is to say, a coil spring 49′ normally holds the half nut 48′ away from the feed screw 37′ and the energizing of magnet 50′ throws the half nut into mesh with the feed screw. The magnet 50′ is shown rigidly mounted on the plate 221 by means of a bracket 224.

The carriage plate 221 is formed with an upper circular section 225 to which a disk 226 is fastened by screws or rivets 227. The disk 226 is arranged in axial alignment with the stationary cylinder 19′ and carries a cylindrical projection of nonmagnetic material comprising a hub or shank 228 and an enlarged head or knob 229. The projection 228–229 is concentric with cylinder 19′ and is a structural part of the scanning carriage GK.

Figure 22:
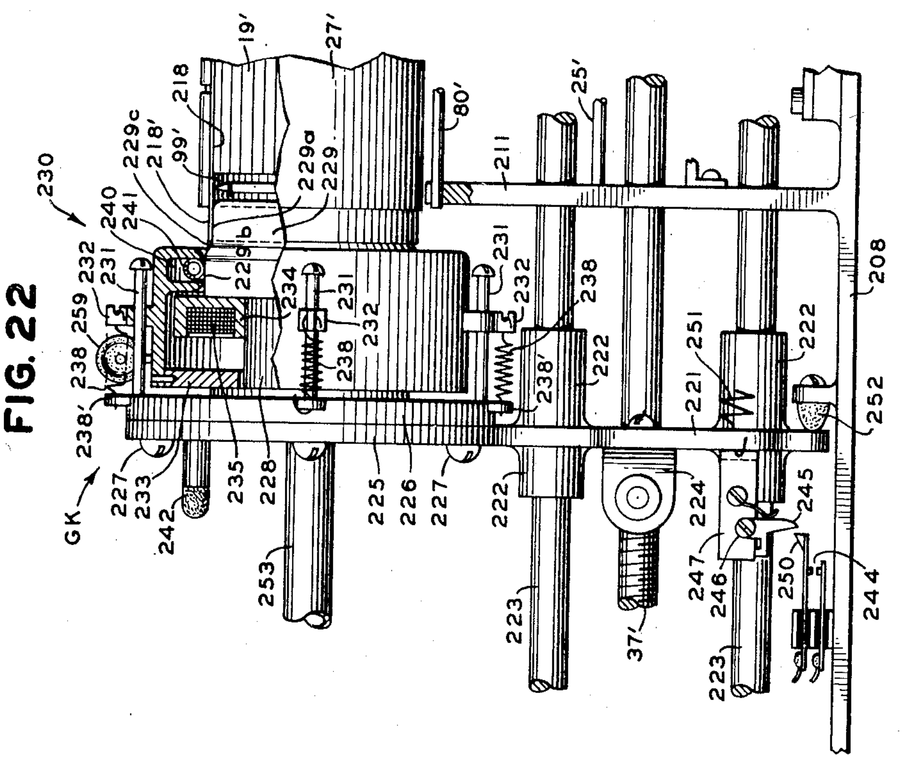
Fig. 22 shows a portion of Fig. 17 with certain parts of the scanning carriage in a different position.
Figure 21:
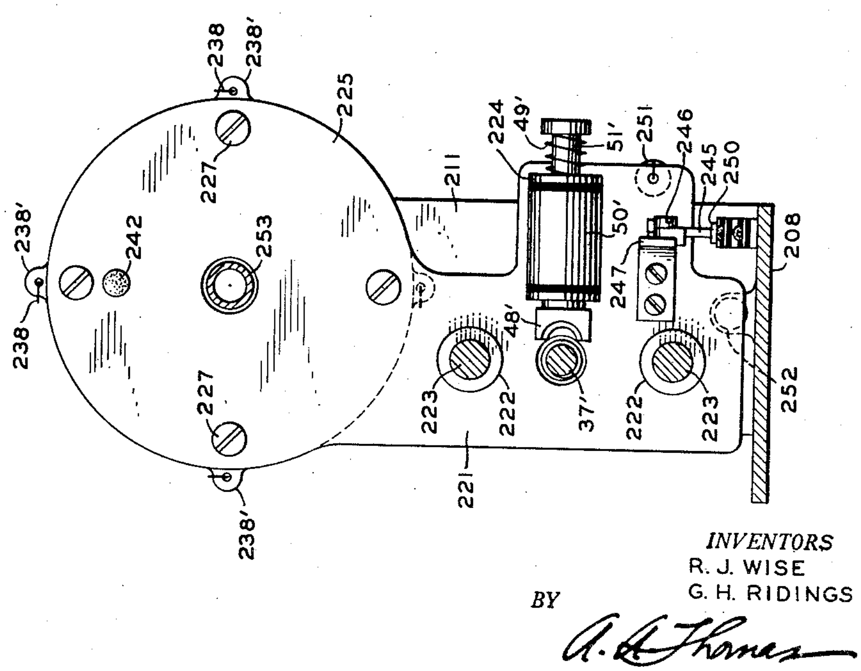
Fig. 21 is a cross section on line 21—21 of Fig. 17.

A cylindrical shell indicated as a unit by 230 is slidably mounted over the projection 228—229 by means of pins 231 which extend from the disk 226 and pass through holes in lugs 232 on the shell. This shell is of nonmagnetic material and is closed at one end by a flat ring 233 of soft iron which constitutes the movable armature for a circular magnet 234 fixed on the hub 228 within the shell 230. A coil 235 is mounted in the annular chamber formed by the concentric circular poles 236 and 237 of the magnet. The iron disk 233, which is rigidly secured to the shell 230, is slidable over the hub 228, thus forming an operative connection between the fixed magnet 234 and the movable shell 230. When the magnet is energized, the armature 233 is drawn against the pole pieces and the shell is moved to the right (as viewed in Fig. 17). When the magnet is deenergized, coil springs 238 fastened to the lugs 232 of shell 230 and to lugs 238′ on disk 226 pull the shell to the left, as shown in Fig. 22.

The head or knob 229 of the cylindrical projection 228–229 has an end section 229a of smaller diameter than its base section 229b. These two cylindrical sections are connected by a circular cam section 229c. The shell 230 is formed with an inner partition 239 which forms with the front wall of the shell a narrow annular chamber 240 in which a so-called garter spring 241 is housed. This spring is a contracting coil spring of fine wire which is constantly in pressure contact with the surface over it, yet it rolls easily over the projection 229 during the movements of shell 230.

The function of the slidable shell 230, which is a part of the scanning carriage GK, is to grip the sheet 218 wrapped around the stationary cylinder 19′ and pull it off the cylinder during the scanning operation. When a cut blank is wrapped around the cylinder 19′ by the wrapper 27′, the shell 230 is in withdrawn position to the left (see Fig. 22), so that the end section 229a of the cylindrical head 229 is free to receive the projecting left end or margin 218′ of the wrapped sheet. Then, when the magnet 234 is energized and moves the shell 230 to the right, the garter spring 241 rolls down the incline 229c and over the end section 229a into tight gripping contact with the projecting end 218′ of the recording blank. The surface of the end section 229a may be slightly roughened to increase the gripping action of spring 241.

Upon movement of the carriage GK to the left by the feed screw 37′, the gripped sheet is pulled off the cylinder as the rotating stylus 99′ does the recording. During this scanning movement of the paper the closed wrapper 27′ remains stationary. Release of magnet 234 causes the springs 238 to withdraw the shell 230 to the left, whereby the recorded sheet is released for removal. It will be convenient to refer to the parts 230 and 234 as the sheet gripper and the gripper magnet, respectively.

Attention is called to the fact that the sheet that is being scanned is supported at both ends during the entire forward movement of the carriage GK, so that the paper remains in stable cylindrical form while being pulled off the stationary cylinder 19′. In Fig. 17, the sides of the dot-dash rectangle 218a may be assumed to indicate the position of the sheet when the carriage is at the end of its forward travel. This shows that the left end of the recorded sheet is still supported by the head 229 of the carriage and the right end of the sheet is still held over the left end of cylinder 19′. This double support of the recording blank during scanning makes it possible to use sheets of unusual length.

When the scanning carriage GK reaches the end of its forward travel, as indicated by the dotted line assembly GK′ in Fig. 17, a button 242 on the carriage closes a normally open switch 243 mounted on the end plate 209 of the framework. This switch, as we shall learn from Fig. 23, controls pneumatic mechanism for removing the recorded sheets from the machine. Another switch 244 is mounted on the base plate 208 and is operated by a trigger 245 on the scanning carriage at the end of its return movement to starting position. The switch 244 has a movable spring arm 244′ which is normally open. The trigger 245 is pivoted at 246 to a bracket 247 on the carriage and a light spring 248 holds the arm 249 of the trigger against the bracket, so that the trigger is stopped from rocking clockwise.

A cam 250 on the free end of switch arm 244′ is in the path of trigger 245. When the trigger encounters the cam 250 during the forward or left movement of the carriage, the trigger is rocked counterclockwise out of the way and the switch 244 remains open. However, during the rapid return movement of the carriage by the coil spring 251, the trigger cams the switch arm 244′ for a moment into closed position. The closing of switch 244 controls the paper feed mechanism, as will be explained in connection with Fig. 23. One or more rubber stops 252 mounted on the base plate 208 cushion the sudden stopping of the carriage in starting position.

A pipe 253 is mounted on the end plate 209 in axial alignment with cylinder 19′ and extends through the hollow projection 228—229 where the open end of the pipe communicates with the recording chamber 254. Tubing 255 is supposed to connect the pipe 253 with a source of exhaust, such as the exhaust fan 206 in Fig. 13, for withdrawing the recording fumes from chamber 254, as previously explained for the suction pipe 189 in Fig. 13. In this machine we also utilize the suction system for another purpose, namely, the automatic removal of the recorded sheets from the scanning carriage.

Referring to Figs. 19 and 20, an angle bracket 256 is mounted on the base 208 and has an arm 257 pivoted thereon at 258. The upper end of arm 257 carries a rubber vacuum cup 259 which communicates through a flexible tube 260 with the same source of suction as the pipe 253 in Fig. 17. The lower end of arm 257 has a lateral extension 261 which is connected by a link 262 to a rotary cam disk 263. The two pivot points of the link are indicated at 264 and 265. The cam disk 263 is mounted on a shaft 266 which is journalled in bracket 256 and carries a gear wheel 267. A motor 268 mounted on the base of bracket 256 has a pinion 269 in mesh with the gear 267 for operating the cam disk 263. As seen in Fig. 19, the connection between the arm 257 and the cam disk 263 is such that, when the pivot 265 of link 262 is highest on the cam disk, the arm 257 is in withdrawn position; that is, farthest to the left, as viewed in Fig. 19.

As the cam disk 262 rotates counterclockwise from the position shown in Fig. 19, the link 262 is pulled down and the arm 257 is rocked forward to the right. When the disk 263 has made half a turn, the pivot point 265 of link 262 is at the bottom of its arc of travel, as indicated at 265′, and the arm 257 is in its forward position 257′ to bring the suction cup 259 into momentary contact with the recorded sheet 218. It is to be assumed that the sheet is still held in cylindrical form by the gripper 230 and the wrapper 28′ when it is first engaged by the suction cup.

During the next half-turn of disk 263 the link 262 moves up to rock the arm of 257 back to the left carrying the removed sheet with it to position 270. Thereupon the suction cup 259 releases the sheet which drops into a suitable receptacle 271. An upper extension 272 on the receptacle guides the sheet on its way down. As will be explained in connection with Fig. 23, before the arm 257 starts back the suction-held sheet is released by the wrapper 27′ and the gripper 230, so that the sheet falls open as it is carried to position 270.

The pneumatic sheet removing operation just described presupposes that the vacuum is put on the cup 259 when it touches the paper and is taken off when the arm 257 is back in normal position. This automatic vacuum control is accomplished by a valve 273 (see Fig. 17) which controls the pneumatic connection between the rubber tube 260 that goes to the suction cup 259 and the pipe 255 that communicates with the source of exhaust. The valve 273 may be of any practical design and by way of example we have shown a rotary disk 274 mounted in the valve casing which has two ports 275 and 276. The first port 275 connects with the source of exhaust and the second port 276 connects with the tube 260 of the suction cup 269. The valve disk 274 has an arcuate channel 277 adapted to span the two ports 275—276 when the valve is in operating condition.

The rotary valve disk 274 is operated by a solenoid 278 mounted on a bracket 279 which is secured to the cross plate 209. The disk 274 has a radial arm 280 which is connected to the plunger 281 of the solenoid. A spring 282 coiled around the plunger normally pushes the latter upward and holds the arm 280 against a stop 283. In this normal or inactive condition of the valve the channel 277 of disk 274 disconnects the vacuum cup tube 260 from the source of exhaust. When the solenoid 278 is energized, the plunger 281 is pulled down and the arm 280 is rocked down against the stop 284. The valve disk 274 is now in a position where the channel 277 connects the ports 275—276, whereby the suction is on in cup 259.

The operation of solenoid 278 is controlled by a switch 285 mounted on the angle bracket 256 (see Fig. 19). This switch is normally open and is closed by the arm 257 when the latter is in its forward position 257′. There are several ways in which the switch 285 can be operated, one way being by a projection 286 on the arm 261 striking a button 287 on the switch. The closing of switch 285 is only momentary while the pivot point 265 on the cam disk 263 is crossing the lowermost position 265′. The circuit connections for the switch 285 appear in Fig 23 and will be described later.

The cam disk 263 controls a switch assembly identified as a unit by 288, which is mounted on the base of 208. This switch unit comprises two pair of contact members 289—290 and 291—292 mounted on an insulating block 293, which also supports a separate spring arm 294. The free end of this arm is weighted and projects into the path of lug 295 on cam disk 263. The contact members 289 and 291 are movable spring arms connected by an insulating cross pin 296 which extends closely adjacent to the arm 294 or barely touching it. The spring arms 289 and 291 are normally in closed position. When the lug 295 of the rotating disk 263 moves the weighted arm 294 aside and suddenly lets the arm go, the momentum of the arm carries it against the cross-piece and both switch arms 289 and 291 are momentarily thrown open. The circuits in which the switch 288 is connected will be explained in the description of Fig. 23.

Figure 23:
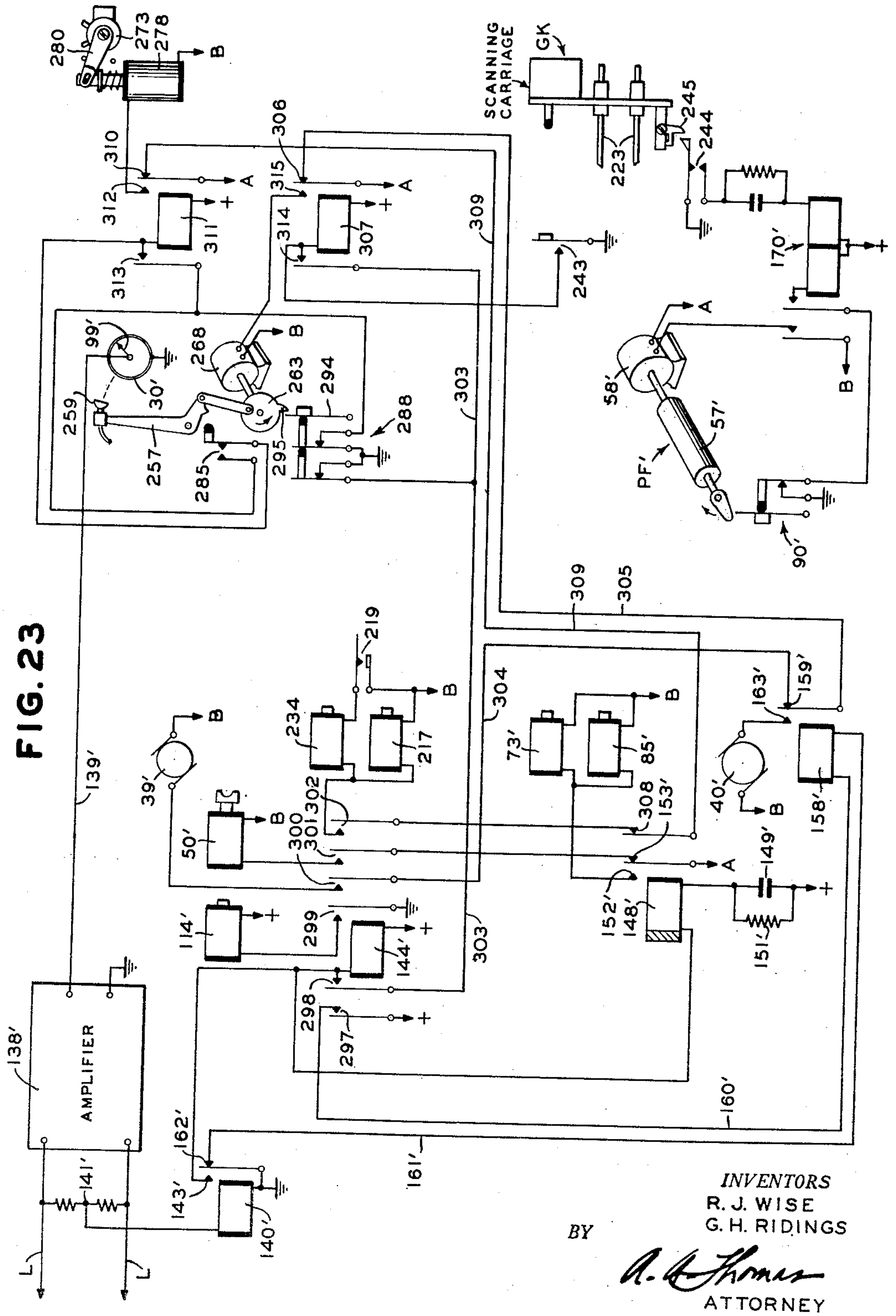
Fig. 23 is a diagram of the control circuits associated with the machine of Figs. 17 to 22.

*Control circuits of Fig. 23*

Certain parts and circuits in Fig. 23 are duplicates of corresponding parts and circuits in Fig 12, so that it will not be necessary to repeat the detailed description of such elements for Fig. 23. It will be sufficient to indicate the corresponding parts in those two wiring diagrams by the same reference numerals, except that a prime mark has been added to those numbers in Fig. 23 for the sake of distinction.

When the line relay 140′ is energized by battery from the transmitter, as explained in Fig. 12, the relays 140′ and 148′ are energized by battery current at the recorder. In this case, the relay 144′ has six make contacts numbered from 297 to 302. The closing of make contact 297 has no effect on the relay 158′ because the open contact 162′ of the energized relay 140′ keeps the circuit of relay 158′ open. The closing of contact 298 locks the relay 140′ in energized condition through wire 303 and the closed switch 288. It should be noted that while the energized relay 144′ is locked, the relay 148′ is energized only a second or two until the condenser 149′ is charged. The momentary closing of make contact 152′ energizes the cutting magnet 73′ and the holding magnet 85′ to cut off the blank previously fed into the flexible wrapper 27′.

The closed contact 299 of energized relay 144′ closes the circuit of phasing magnet 114′. The closed contact 300 connects the low-speed motor 39′ to the bus bars of the alternating current source through wire 304, closed contact 159′ of relay 158′ (not energized now), wire 305 and the closed contact 306 of a relay 307, which is not energized at this time. The closing of contact 301 energizes the half-nut magnet 50′ to connect the scanning carriage GK with the feed screw 37′. This, of course, happens after the slow action relay 148′ has been deenergized and its back contact 153′ is closed.

The closing of relay contact 302 energizes the wrapping magnet 217 and the gripper magnet 234, the power circuit being closed through the back contact 308 of the released relay 148′, wire 309 and contact 310 of a relay 311, which is still inactive. It should be noted that the normally open switch 219 prevents the energizing of the gripper magnet 234 until that switch is closed by the plunger of the wrapping magnet 217. In other words, the gripper magnet 234 cannot operate until the cut blank 218 has been wrapped around the cylinder 19'.

The relay 311 is energized only upon the closing of switch 285 when the rock arm 257 is in its forward position 257', as shown in Fig. 19. Therefore, when the suction cup 259 touches the recorded sheet, the relay 311 is energized and closes its make contacts 312 and 313. The closing of contact 312 connects the solenoid 278 in the power circuit and the valve 273 is operated to connect the cup 259 with the suction pipe 255. The relay 311 locks through its contact 313 as long as the switch 288 is closed. The opening of this switch by the cam lug 295 on disk 263 at the moment when (or immediately after) the arm 257 has carried the removal sheet to delivery position 270 automatically releases the relay 311, whereupon the valve 273 disconnects the cup from the vacuum.

It is important that the sheet removing arm 257 be operated in correctly timed relation to the movements of the scanning carriage GK. More specifically stated, the arm 257 should operate only when the carriage is at the end of its forward travel and the suction cup 259 should make contact with the recorded sheet while it is still held at both ends by the flexible former 27' and by the gripper 230. This timed operation of the arm 257 is effected by means of the relay 307 which is energized only when the carriage GK closes the switch 243 at the end of its forward movement. The energized relay 307 locks through its make contact 314 and the closed switch 288. The closed contact 315 of relay 307 completes the circuit of the motor 268 which drives the cam disk 263 for one revolution to move the arm 257 forward and back, whereupon the cam lug 295 on the disk momentarily opens the switch 288. This releases the relay 307, opens the contact 315 and stops the motor 268, leaving the arm 257 in the position shown in Figs. 19 and 23.

It will be recalled that the starting relay 144', when energized by the operation of the line relay 140', locks through its contact 298, wire 303 and the closed switch 288. The relay 307 likewise locks through switch 288 when it is energized at the end of the forward carriage movement by the momentary closing of switch 243. As already told, the closing of contact 315 by relay 307 energizes the motor 268 to operate the pneumatic sheet removing mechanism. Remember that at this time the wrapping magnet 217 and the gripping magnet 234 are still energized through the closed relay contacts 302 and 308, wire 309, and the closed back contact 310 of the inert relay 311. Therefore, the cylindrical sheet of recorded paper is still held at both ends when the suction cup makes contact with it at the end of the forward movement of arm 257. At that moment the switch 285 is closed, the relay 311 is energized and its closed contact 312 operates the solenoid 278 to apply suction to the cup 259 which thus grips the paper.

When the energized relay 311 breaks its contact 310, it opens the circuit of wrapping magnet 217 and gripping magnet 234 whereby both ends of the cylindrical sheet are released. This occurs when the paper adheres to the suction cup and when the arm 257 is on the point of returning. The release of the cup-held sheet causes it to open and in this open condition the sheet is carried by the returning arm 257 to the dotted line position 270 in Fig. 19. If we look at this figure from right to left, the position 270 of the open sheet corresponds to the rectangular outline 218a of Fig. 17. When the arm 257 is back in normal position after one turn of the cam disk 263, the switch 288 is opened, thereby releasing the relays 144', 307 and 311.

Only one more thing remains to be done before the machine is ready for the next scanning operation and that is the feeding of a blank length of paper into the flexible wrapper 27'. Since the paper feed mechanism PF' of Fig. 23 is assumed to be a duplicate of the paper feed mechanism PF in Fig. 12, the previous detailed description of mechanism PF applies fully to mechanism PF' in which the reference numerals correspond to those in PF with an added prime mark for distinction. In Fig. 23 the switch 244 which is closed by the carriage GK upon return to starting position is the equivalent of switch 164 in Fig. 12.

*Operation of machine in Figs. 17 to 23*

The general operation of the machine shown in Figs. 17 to 23 will be clear in all details from the preceding description. For convenience we present the following summary:

Assume that a blank length of paper has been fed into the open former or wrapper 27' beneath the scanning cylinder 19'. It should be assumed that this paper feed operation took place at the close of the last recording operation. Starting of the transmitter energizes the relay 144' which locks through the closed switch 288, whereupon the machine performs these functions automatically:

The cutting magnet 73' and the holding magnet 85' are energized to operate the shears that cut off the blank previously fed into the wrapper 27'. These magnets are operated by the momentary energizing of relay 148'.

As soon as the paper has been cut off and the relay 148' released to close its contact 308, the wrapping magnet 217 is energized to close the wrapper 27' and wrap the sheet around the stationary cylinder 19'. A second later the gripper magnet 234 is energized and the shell 230 is moved over to grip the wrapped sheet, as shown in Fig. 17.

Simultaneously with the wrapping and gripping of the sheet the half nut magnet 50' is energized to connect the carriage GK to the feed screw 37', the low speed motor 39' is energized to operate the feed screw, and the phasing magnet 114' is operated to connect the stylus 99' to its driving motor.

The machine is now in condition to record the facsimile signals coming through the amplifier 138' and received by the electric stylus 99' which records them on the inner surface of the cylindrical sheet of paper held by the wrapper 27' and the gripper 230. The recording operation continues until the end of the message is reached at the transmitter, whereupon the facsimile signals cease and the following happens at the recorder:

The line relay 140' is released and closes the circuit of relay 158' which cuts out the low speed motor 39' and cuts in the high speed motor 40'. The carriage GK is therefore moved rapidly to the end of its forward travel and there it closes the switch 243.

The relay 307 is now energized and locks through the closed switch 288. The relay contact 315 closes the circuit of motor 268 and the suction cup 259 is moved forward against the recorded sheet which is still held in cylindrical form by the gripper shell 230 at the left end and by the closed wrapper 27' at the other end.

As the suction cup 259 touches the paper, the switch 285 is closed for a moment to energize the relay 311 which locks through the switch 288 and energizes the solenoid 278. This opens the valve 273 and the cup is connected with the suction fan as the arm 257 is about to return.

The moment the relay 311 is energized to turn on the vacuum, the open contact 310 breaks the circuit of the wrapping magnet 217 and the gripper magnet 234, whereby the recorded sheet now attached to the cup 259 by suction is completely released and is free to be carried away by the returning arm 257.

When the removed sheet is over the delivery chute 271 (Fig. 19) the cam disk 263 momentarily opens the switch 288 whereupon the relays 307, 311, 158' and 144' are released. This stops the motor 268, disconnects the cup 259 from the suction fan, cuts out the high speed motor 40' and releases the half nut magnet 50' to release the carriage GK for return to starting position.

It should be understood that the various operations just described, including the removal of the recorded sheet, take place during the moment that the carriage GK is in final forward position. Upon reaching its starting position the carriage closes the switch 244 and sets the paper feed mechanism PF' in operation to feed a blank length of paper from the continuous roll into the open wrapper 27' under the stationary cylinder 19'.

The machine is now ready for the next recording operation and the cycle above described is automatically repeated over and over again as long as messages keep coming from the transmitter. All the attendant at the recorder has to do is to gather up the received messages and throw off the power switch when the machine is to be shut down.

Although we have shown and described certain specific constructions, it is to be understood that our invention is not limited to the details appearing in these illustrative embodiments. Further, the various machines herein set forth have been described as recorders because they were primarily designed for that purpose. It is apparent, however, that these machines will also operate as transmitters by substituting a transmitting mechanism for the recording stylus and making other appropriate changes within the skill of the engineer. Then, too, it is not necessary that all the novel features of our invention shall be embodied in the same machine, for certain features may be used to advantage without others. In the commercial forms of our invention various changes and modifications may be resorted to within the scope of the appended claims.

We claim:

1. In a facsimile machine, a stationary cylinder, a flexible member normally in flat condition for receiving a sheet, means for operating said member to wrap the sheet around said cylinder and support it in cylindrical form for scanning, means for sliding the supported sheet axially along the cylinder during a scanning operation so that the cylindrical sheet is drawn off one end of the cylinder, and electrical scanning mechanism including a rotary stylus arranged to scan the cylindrical surface of the sheet as it moves off said end of the cylinder.

2. In a facsimile recorder, a stationary cylinder, a stylus mounted near one end of said cylinder and pivoted in the axis thereof so as to rotate in a plane perpendicular to the cylinder axis, so that the stylus point revolves in a circle substantially coincident with and slightly spaced from the periphery of the cylinder, means for holding a recording blank wrapped around said cylinder in substantially complete cylindrical form for scanning, and means for sliding the blank off the cylinder during rotation of the stylus which records on the inner surface of the moving blank as it clears said cylinder.

3. In a facsimile recorder, a stationary cylinder, means for holding a unitary recording blank wrapped around the outside of said cylinder so that the blank is supported in substantially complete cylindrical form for scanning, means for sliding said blank along the cylinder whereby the blank overlaps one end of the cylinder to expose the inner surface of the blank, a stylus rotatable near said overlapped end of the cylinder to record on the inner surface of the blank as it slides off said overlapped end of the cylinder, and means for causing said blank holding means to release the recorded sheet for removal.

4. In a facsimile recorder, a stationary cylinder, means for supporting a unitary recording blank on the outside of said cylinder in substantially complete cylindrical form and sliding it off one end thereof, a rotary shaft extending axially through said cylinder, a recording stylus mounted on said shaft slightly beyond said end of the cylinder, said stylus being so arranged that it engages the inner surface of the paper as it slides off the cylinder, and means for operating said shaft to revolve the stylus.

5. In a facsimile recorder, a stationary cylinder, a flexible band operable to wrap a recording blank around said cylinder, means for sliding said band and blank as a unit along the cylinder so that the blank overlaps one end of the cylinder for recording, and a rotary stylus mounted slightly beyond said overlapped end of the cylinder to record on the inner surface of the blank as it slides off the cylinder.

6. In a facsimile recorder, a stationary cylinder, a flexible band of conducting material operable to wrap a recording blank around said cylinder, means for sliding said band and blank as a unit along the cylinder so that the blank overlaps one end of the cylinder for recording, and an electric stylus mounted to rotate slightly beyond said overlapped end of the cylinder to record on the inner surface of the blank as it slides off the cylinder, said conducting band forming an electric contact which co-operates with the stylus in the recording operation.

7. In a facsimile machine, a cylinder for holding a sheet to be scanned, means for feeding a definite length of paper from a continuous supply roll into alignment with said cylinder, means for supporting said length of paper in flat condition, means for cutting off said supported length of paper to form a sheet, connections for operating said supporting means to wrap the severed sheet around the outside of said cylinder for scanning, means for causing a sliding movement of the sheet on said cylinder, and means for scanning the sliding sheet.

8. In a facsimile machine, a cylinder for holding copy to be scanned, means for supporting a continuous roll of paper transversely of said cylinder, means for feeding a definite length of paper from said supply roll into alignment with the cylinder, means for cutting off said length of paper to form a sheet, means for mounting the severed sheet on said cylinder control devices for operating said feeding means and cutting means and mounting means in timed sequence, and a device for scanning the sheet mounted on said cylinder.

9. In a facsimile machine, a stationary cylinder, a flexible wrapper mounted adjacent to said cylinder and normally flat or open, means for feeding a definite length of paper to said wrapper from a continuous supply roll, said length of paper being supported in flat condition on the open wrapper, means for cutting off said length of paper, and means for closing said wrapper to wrap the severed sheet around said cylinder for scanning.

10. In a facsimile machine, a stationary cylinder, a flexible sheet receiving member mounted adjacent to said cylinder, means for feeding a length of paper from a supply roll onto said flexible member, a cutting device, means for operating said device to cut off the length of paper fed to said member, and means for flexing said member to wrap the severed sheet around the cylinder for scanning.

11. In a facsimile machine, a stationary cylinder, means for feeding a definite length of paper from a continuous supply roll into alignment with said cylinder, the feeding movement of the paper being from one end of the cylinder toward the other, means for cutting off said length of paper on a line at right angles to the cylinder axis, means for wrapping the severed sheet around said cylinder and holding it in scanning position, connections for automatically operating said wrapping means in timed relation to said cutting means, and mechanism for scanning the sheet wrapped around said cylinder.

12. In a facsimile machine, a cylinder for holding copy to be scanned, means for feeding a definite length of paper from a continuous supply roll into alignment with said cylinder, means for cutting off said length of paper to form a sheet, means for pressing the paper against the cylinder during the cutting operation, and means for mounting the severed sheet on the cylinder for scanning.

13. In a facsimile machine, a cylinder, a flexible band supported adjacent to said cylinder and normally flat or open to receive a sheet of paper, means for feeding a length of paper from a supply roll to the open band, a shearing device for cutting off the paper fed to said band to form a sheet, means for automatically pressing the paper against the cylinder during the shearing operation, and means for wrapping said band and the severed sheet around the cylinder for scanning.

14. In a facsimile machine, a stationary cylinder, a flexible sheet receiving member mounted adjacent to said cylinder, means for feeding a length of paper from a supply roll onto said flexible member, a cutting device arranged at right angles to the cylinder, means for operating said device to cut off the length of paper fed to said member, means for flexing said member to wrap the severed sheet around the cylinder for scanning, and means for retaining the severed end of the paper in position for the next feeding operation.

15. In a facsimile machine, a stationary cylinder, means for holding a unitary sheet wrapped around the outside of said cylinder for scanning, mechanism for scanning said sheet, and means for sliding the sheet off the cylinder during the scanning operation while said holding means remains stationary.

16. In a facsimile machine, a stationary cylinder, means for holding a unitary sheet wrapped around the outside of said cylinder for scanning, mechanism for scanning the sheet wrapped around the cylinder, and means for pulling the supported sheet off one end of the cylinder during the scanning operation while said holding means remains stationary.

17. In a facsimile machine, a stationary cylinder, means for holding a unitary sheet wrapped around the outside of said cylinder for scanning, a device for gripping one end of said sheet and sliding the same off the cylinder during the scanning operation while said holding means remains stationary, mechanism for scanning the sheet as it slides off the cylinder, and means for controlling the gripping action of said device.

18. In a facsimile machine, a stationary cylinder, a flexible band normally in flat condition for receiving a sheet, means for operating said band to wrap the sheet around said cylinder, means independent of said band for sliding the sheet off the cylinder while the band remains stationary, and a device for scanning the sheet as it slides off the cylinder.

19. In a facsimile machine, a stationary cylinder, means for holding a unitary sheet wrapped around the outside of said cylinder for scanning, a device for scanning the sheet wrapped around the cylinder, means for pulling the supported sheet off one end of the cylinder during the scanning operation while said holding means remains stationary, and automatic means for removing the scanned sheet from both of said means.

20. In a facsimile machine, a stationary cylinder and a slidable cylinder arranged in axial alignment for jointly supporting a sheet in scanning position, means for wrapping a sheet around both of said cylinders, means for holding one end of the sheet on said slidable cylinder, scanning means for the supported sheet, and means for operating said slidable cylinder to pull the sheet off the stationary cylinder during the scanning operation.

21. A facsimile machine provided with scanning mechanism, and a pneumatic device for automatically removing a scanned sheet from said mechanism.

22. A facsimile machine provided with scanning mechanism, a pneumatic device for automatically removing a scanned sheet from said mechanism and carrying the sheet to a point of discharge, and means controlled by the carrying action of said device for releasing the removed sheet.

23. A facsimile recorder having mechanism for recording with an electric stylus, suction means for withdrawing fumes evolved by the action of said stylus during a recording operation, and means operated by said suction means for removing a recorded copy from said mechanism.

24. A facsimile machine having a stationary cylinder, a slidable carriage for holding a sheet wrapped around the outside of said cylinder for scanning, means for scanning a sheet wrapped around said cylinder, and movable means automatically operable after a scanning operation to seize the scanned sheet while it is still on said carriage and withdraw it therefrom.

25. In a facsimile machine, a scanning mechanism having a reciprocable carriage for holding a sheet in scanning position during the forward movement of the carriage, and movable means rendered effective by the return movement of the carriage for seizing the scanned sheet while it is still on the carriage at the end of its forward movement and automatically stripping the sheet from the carriage during its return movement.

26. A facsimile machine having a stationary cylinder, a slidable carriage for holding a sheet on said cylinder for scanning, means for scanning a sheet on said cylinder, a device automatically operable after a scanning operation to seize the scanned sheet while it is still on the carriage and strip it from said carriage, and electrically controlled means for operating said stripping device to discharge the sheet.

27. In a facsimile machine, scanning mechanism having a reciprocable carriage for moving a sheet forward during the scanning operation, a toothed member for seizing the scanned sheet while it is still on the carriage at the end of its forward movement and automatically stripping the sheet from the carriage when the latter moves back to starting position, and means for causing said member to release the removed sheet.

28. A facsimile machine having mechanism for scanning a supported sheet, said mechanism including a slidable carriage for moving the sheet through the scanning field, a device for automatically removing a scanned sheet from said carriage and transferring the sheet to a position of discharge, said device remaining inactive during the scanning operation, and electrically controlled means for operating said device to release the sheet in discharge position.

29. In a facsimile machine, scanning mechanism including a cylinder, means for holding a unitary sheet wrapped around the outside of said cylinder, means for producing relative sliding movement between the supported sheet and the cylinder during the scanning operation, means for automatically stopping said sliding movement when the required scanning distance has been traversed, and automatic mechanism for removing the scanned sheet from said holding means after termination of said sliding movement, said sheet removing mechanism having a pivoted sheet gripping member.

30. In a facsimile machine, scanning mechanism including a stationary cylinder for supporting a unitary sheet to be scanned, means for holding a sheet wrapped around the outside of said cylinder in scanning position, means for sliding a sheet along said cylinder during the scanning operation, said sliding movement of the sheet being stopped upon completion of the required scanning distance, and a device for automatically removing the scanned sheet from said holding means after the termination of said sliding movement, said device including electrically controlled means for transferring the removed sheet to a point of discharge.

31. In a facsimile machine, a stationary cylinder and mechanism for holding a unitary sheet wrapped around the outside of said cylinder and sliding it off the cylinder for scanning, said mechanism including a rigid cylindrical member movable axially away from said cylinder and cooperating therewith for supporting both ends of the sheet which is thereby maintained in true cylindrical form as it slides off the cylinder during a scanning operation.

32. In a facsimile machine, a stationary cylinder, means for holding a sheet on said cylinder so that one end of the sheet overlaps the cylinder, means for sliding the sheet off said cylinder during the scanning operation, and means movable with the sliding sheet adapted to engage the inner surface of the sheet and hold its overlapping end in cylindrical form as the sheet slides off the stationary cylinder.

33. In a facsimile machine, a stationary cylinder and a slidable cylinder arranged in axial alignment for jointly supporting a sheet in scanning position, said cylinders being separated by a space in which a scanning member is operatively mounted, and means for sliding the sheet off said stationary cylinder during the scanning operation while one end of the sheet remains supported on said slidable cylinder.

34. In a facsimile recorder, a stationary cylinder, means for holding a recording blank on said cylinder for scanning, an electric recording stylus rotatably mounted in concentric relation to said cylinder for scanning the inner surface of the supported blank, and a suction tube mounted in axial alignment with said cylinder and extending toward said stylus for withdrawing the fumes evolved by the action of the stylus.

35. In a facsimile machine having a scanning device, a pair of cylinders mounted in axial alignment and adapted to support a sheet in operative relation to said scanning device, and means for axially separating said cylinders during a scanning operation while both ends of the sheet remain in supporting engagement with said cylinders as they separate, whereby the intervening portion of the sheet is maintained in cylindrical form for scanning.

36. In a facsimile machine, a stationary cylinder and a slidable cylinder arranged in axial alignment for jointly supporting a sheet in scanning position, a flexible band operable to wrap a sheet around both of said cylinders, scanning means for the supported sheet, and means for sliding said band and slidable cylinder to move the sheet axially off the stationary cylinder, one end of the sheet remaining supported by the slidable cylinder as the sheet slides off the stationary cylinder.

37. In a facsimile machine, a stationary cylinder and a slidable cylinder mounted in axial alignment, means cooperating with said cylinders for holding a sheet on both cylinders for scanning, and means for moving said slidable cylinder axially away from the stationary cylinder during a scanning operation while one end of the cylindrical sheet remains supported on the slidable cylinder, the other end of the sheet being held on the stationary cylinder by said sheet-holding means during a scanning operation.

38. In a facsimile machine, a stationary cylinder and a slidable cylinder mounted in axial alignment, said cylinders being normally separated to provide a space between their adjacent ends, means for holding a sheet around said cylinders and sliding it off the stationary cylinder for scanning, and a rotary element operable in said space for scanning the inner cylindrical surface of the supported sheet, said slidable cylinder being carried along by said sheet holding means to maintain the sheet in cylindrical form as it slides off the stationary cylinder during the scanning operation.

39. In a facsimile machine, a stationary cylinder and a slidable cylinder mounted in axial alignment, said cylinders being normally separated to provide a space between their adjacent ends, means for holding a sheet around both cylinders, means for sliding the sheet off the stationary cylinder for scanning while both ends of the sheet remain supported on said cylinders, an electric stylus rotatable in said space for scanning the inner cylindrical surface of the supported sheet, and suction means connecting said space through the slidable cylinder for withdrawing the fumes evolved by the action of said stylus.

40. A facsimile machine having a stationary cylinder, scanning mechanism associated with said cylinder, a flexible member supported adjacent to said cylinder and normally flat to receive a sheet of paper, means for feeding a length of paper from a supply roll onto said member, means for cutting off the length of paper fed to said member, means for wrapping the flexible member and the severed sheet around said cylinder to hold the sheet in scanning position, means for sliding said member and sheet along the stationary cylinder during a scanning operation, and means for operating said member to release the scanned sheet.

41. A facsimile machine having a cylinder, scanning mechanism associated with said cylinder, a flexible band supported below said cylinder and normally flat or open to receive a sheet of paper, means for feeding a length of paper from a supply roll to the open band, shears for cutting off the paper fed to said band, an electric device for operating said shears, a member movably mounted below said band, an electric device for moving said member upward to raise the band and thereby press the blank against the cylinder during the shearing operation, means for automatically energizing said electric devices at the end of a feeding operation, and means for wrapping said band and severed sheet around the cylinder for scanning, and connections for automatically operating said scanning mechanism when the sheet has been wrapped around the cylinder.

42. In a facsimile machine, a stationary cylinder, pivoted arms adapted to open and close, a flexible band carried by said arms and extending laterally of the cylinder as a flat support when the arms are open, means providing a paper guide passage along one edge of said band at right angles to the cylinder, means for feeding a length of paper from a supply roll through said guide passage onto the flat band, means for cutting off the paper on a line between said guide passage and the adjacent edge of the band, whereby the end of the paper coming from the supply roll remains in said guide passage for the next feeding operation, and means for closing said arms to wrap the flexible band and the severed sheet around said cylinder for scanning.

43. A facsimile recorder having a stationary cylinder, a pair of pivoted arms adapted to open and close, a flexible band secured to said arms and adapted to lie flat when the arms are opened, means for feeding a length of paper from a supply roll onto the flat band, a shearing device for cutting off the blank fed to said band, means for closing said arms to wrap the flexible band and the severed blank around said cylinder whereby the blank is held in recording position, means for sliding the blank off the cylinder while said arms remain closed, a rotary stylus arranged to record on the inner surface of the supported blank as it slides off the cylinder, and means for automatically opening said arms after a recording operation.

44. In a facsimile recorder, a stationary cylinder, a slidable carriage mounted below said cylinder, a pair of pivoted arms mounted on said carriage so as to open and close, a flexible band secured to said arms and adapted to lie flat under the cylinder when the arms are opened and the carriage is in starting position, means for feeding a recording blank to said band when it lies flat under the cylinder, means for closing said arms to wrap the flexible band and the contained blank around said cylinder for recording, connections for operating said carriage to slide the blank off the cylinder while said arms remain closed, a rotary stylus mounted at one end of the cylinder to record on the inner surface of the supported blank as it slides off the cylinder, means for opening said arms after a recording operation to expose the recorded blank for removal, means whereby the carriage returns to starting position after said arms are opened, and a device operable on the return movement of the carriage for removing the recorded blank from the open band.

RALEIGH J. WISE.
GARVICE H. RIDINGS.

REFERENCES CITED

The following references are of record in the file of this patent:

UNITED STATES PATENTS

| Number | Name | Date |
|---|---|---|
| 1,635,324 | Jenkins | July 12, 1927 |
| 2,085,034 | Magill | June 29, 1937 |
| 2,127,331 | Fulton | Aug. 16, 1938 |